| (12) | United States Patent | (10) Patent No.: | US 8,540,090 B2 |
|---|---|---|---|
| | Caveney et al. | (45) Date of Patent: | Sep. 24, 2013 |

(54) TELESCOPING WIRE CABLE TRAY SYSTEM

(75) Inventors: Jack E. Caveney, North Palm Beach, FL (US); Shaun P. Brouwer, St. John, IN (US); Robert Nicoli, Glenwood, IL (US); David R. Davis, Richton Park, IL (US); Samuel C. Ramey, Naperville, IL (US); Samuel M. Marrs, Bradley, IL (US)

(73) Assignee: Panduit Corp., Tinley Park, IL (US)

( * ) Notice: Subject to any disclaimer, the term of this patent is extended or adjusted under 35 U.S.C. 154(b) by 454 days.

(21) Appl. No.: 12/779,439

(22) Filed: May 13, 2010

(65) Prior Publication Data

US 2011/0006022 A1 Jan. 13, 2011

Related U.S. Application Data

(60) Provisional application No. 61/179,483, filed on May 19, 2009, provisional application No. 61/219,433, filed on Jun. 23, 2009.

(51) Int. Cl.
*A47F 5/08* (2006.01)
*F16L 3/00* (2006.01)

(52) U.S. Cl.
USPC .......... 211/119; 211/133.5; 248/58; 248/68.1

(58) Field of Classification Search
USPC ................... 211/119, 113, 117, 133.5, 181.1; 248/250, 68.1, 58, 61
See application file for complete search history.

(56) References Cited

U.S. PATENT DOCUMENTS

| 5,553,824 A | 9/1996 | Dutra, Jr. |
| RE35,479 E | 3/1997 | Witherbee et al. |
| 5,704,571 A | 1/1998 | Vargo |
| 5,899,041 A | 5/1999 | Durin |
| 6,082,690 A | 7/2000 | Durin et al. |
| 6,143,984 A | 11/2000 | Auteri |
| 6,332,548 B1 | 12/2001 | West et al. |
| 6,354,542 B1 * | 3/2002 | Meyer et al. .................... 248/58 |

(Continued)

FOREIGN PATENT DOCUMENTS

| EP | 2028739 A1 | 2/2009 |
| FR | 2848350 A1 | 6/2004 |
| WO | 2005090846 A1 | 9/2005 |
| WO | 2008111887 A1 | 9/2008 |

OTHER PUBLICATIONS

Hoffman Enclosures, Inc.'s Clean Tray™ Stainless Steel Cable Tray catalog pages, 2 pages, 2008.

(Continued)

*Primary Examiner* — Jonathan Liu
*Assistant Examiner* — Stanton L Krycinski
(74) *Attorney, Agent, or Firm* — Christopher S. Clancy; Aimee E. McVady

(57) ABSTRACT

The present invention is directed to a telescoping wire cable tray system. The wire cable tray system includes an outer wire cable tray and an inner wire cable tray positioned within the outer wire cable tray. The inner wire cable tray slides or telescopes with respect to the outer wire cable tray enabling the length of the wire cable trays to be adjusted during installation of the wire cable tray system. The wire cable tray system may include trapeze support bars, clamps, side walls or downspout fittings.

16 Claims, 44 Drawing Sheets

(56) References Cited

U.S. PATENT DOCUMENTS

| | | | |
|---|---|---|---|
| 6,361,000 B1 * | 3/2002 | Jette | 248/49 |
| 6,401,939 B1 | 6/2002 | Durin | |
| 6,409,031 B1 * | 6/2002 | Wynne | 211/119 |
| 6,412,733 B1 | 7/2002 | Grzemski | |
| 6,435,105 B1 * | 8/2002 | Mikich et al. | 108/42 |
| 6,460,812 B1 * | 10/2002 | Jette | 248/49 |
| 6,489,566 B1 | 12/2002 | Durin | |
| 6,631,874 B2 | 10/2003 | Turpin et al. | |
| 6,637,704 B2 * | 10/2003 | Jette | 248/49 |
| 6,644,603 B2 | 11/2003 | Bailleux | |
| 6,685,037 B1 | 2/2004 | Zadak | |
| 6,715,427 B2 * | 4/2004 | Mikich et al. | 108/42 |
| 6,739,795 B1 | 5/2004 | Haataja et al. | |
| 6,879,490 B2 | 4/2005 | Mattei et al. | |
| 7,055,786 B2 | 6/2006 | Garassino et al. | |
| 7,152,535 B2 * | 12/2006 | Mikich et al. | 108/42 |
| 7,188,740 B2 | 3/2007 | Marchetta et al. | |
| 7,373,759 B1 | 5/2008 | Simmons | |
| 7,383,634 B2 | 6/2008 | Haataja et al. | |
| 7,462,785 B1 | 12/2008 | Davis et al. | |
| 7,468,491 B2 | 12/2008 | Deciry et al. | |
| 7,476,801 B1 | 1/2009 | Davis et al. | |
| 7,523,897 B2 | 4/2009 | Boltz et al. | |
| 7,586,036 B2 | 9/2009 | Davis et al. | |
| 7,810,438 B2 * | 10/2010 | Ryberg | 108/42 |
| 7,959,019 B2 * | 6/2011 | Jette | 211/117 |
| 2003/0156892 A1 | 8/2003 | Finco et al. | |
| 2004/0056157 A1 * | 3/2004 | Dufourg | 248/68.1 |
| 2004/0104322 A1 | 6/2004 | Hennequin | |
| 2004/0144898 A1 | 7/2004 | Spagnoli | |
| 2006/0038091 A1 | 2/2006 | Winn et al. | |
| 2008/0308515 A1 | 12/2008 | Lange et al. | |
| 2009/0289152 A1 | 11/2009 | Crain et al. | |

OTHER PUBLICATIONS

Altex Computers & Electronics' Adjustable Telescoping Rackshelf webpage, 1 page, May 14, 2010.
Cooper B-Line's Flextray® Accessories catalog and webpage, 4 pages, May 1, 2009.
Krieg & Zivy's cable exit webpage, 2 pages, May 1, 2009.
Cablofil's Cableexit webpage, 4 pages, May 1, 2009.

* cited by examiner

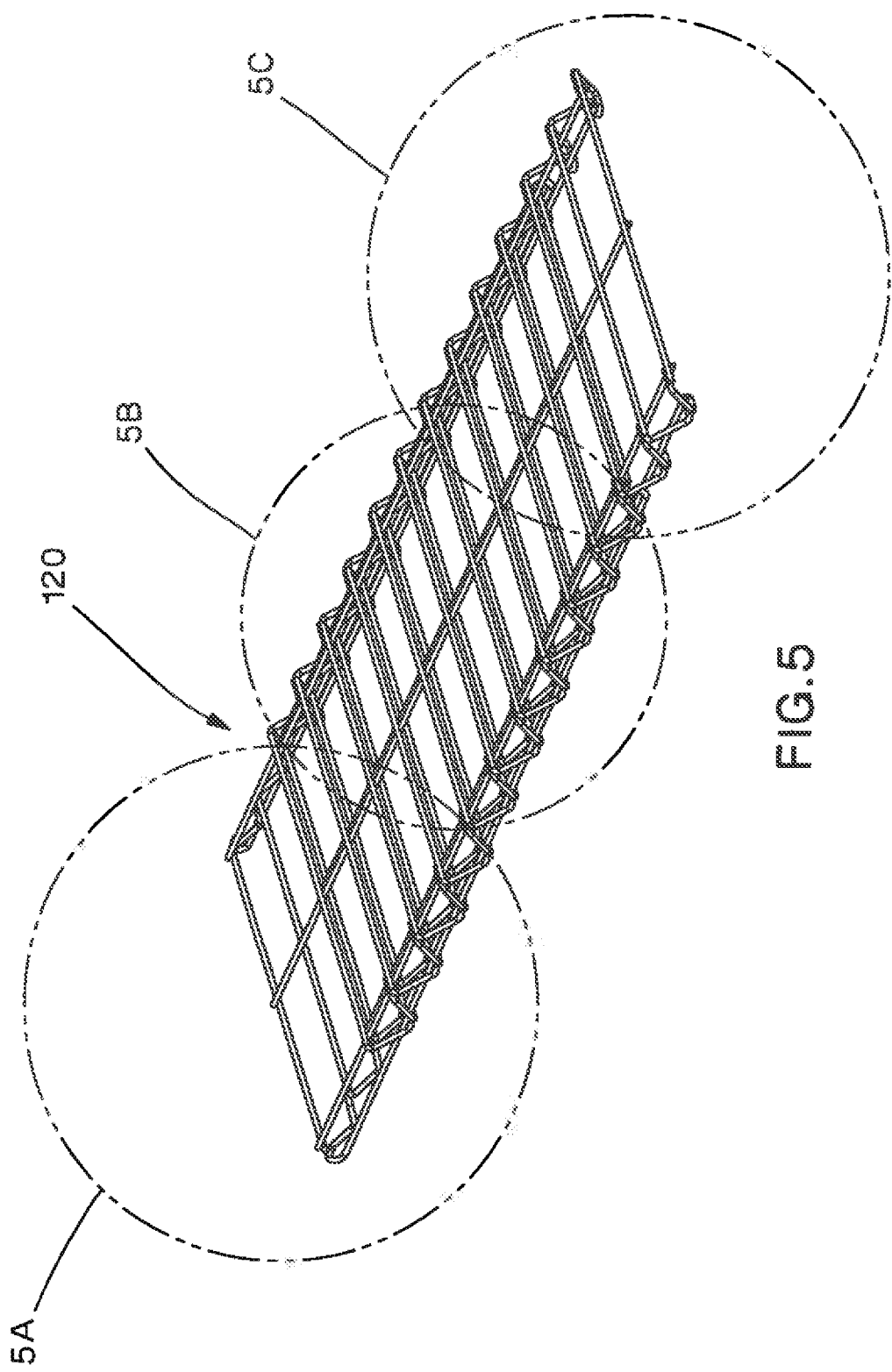

TELESCOPING WIRE CABLE TRAY SYSTEM

CROSS-REFERENCE TO RELATED APPLICATIONS

This application claims priority to U.S. Provisional Application No. 61/179,483, filed May 19, 2009 and U.S. Provisional Application No. 61/219,433, filed Jun. 23, 2009, the subject matter of which is hereby incorporated by reference in its entirety.

BACKGROUND OF THE INVENTION

The present invention relates to a wire cable tray system and, in particular, the invention relates to a telescoping wire cable tray system with adjustable length wire cable trays to accommodate various overhead applications.

Wire cable tray systems are used in data centers and other areas to run cables overhead or below raised floors. Cable tray systems are generally shipped in long sections (e.g., 10 feet) and cut to fit during installation. Cutting and deburring cable trays during installation is very time consuming, and the cut ends can be sharp.

Therefore, there is a need for a cable tray system that allows for adjusting the length of the cable trays without cutting the cable trays during installation.

SUMMARY

A wire cable tray system comprised of a plurality of wire cable trays and at least one trapeze support device for supporting the wire cable trays. The wire cable trays include a plurality of transverse wires and a plurality of longitudinal wires. The trapeze support device includes a trapeze support bar and at least one locking clip. The trapeze support bar includes a channel defined by a bottom and side walls extending from the bottom. The side walls include an upper support surface and a lower support surface. The locking clip slides over the channel to secure the trapeze support device to the wire cable trays.

BRIEF DESCRIPTION OF THE DRAWINGS

FIG. 5 illustrates a top perspective view of an alternative embodiment of the telescoping wire cable tray system of the present invention;

DETAILED DESCRIPTION

Figure 1:
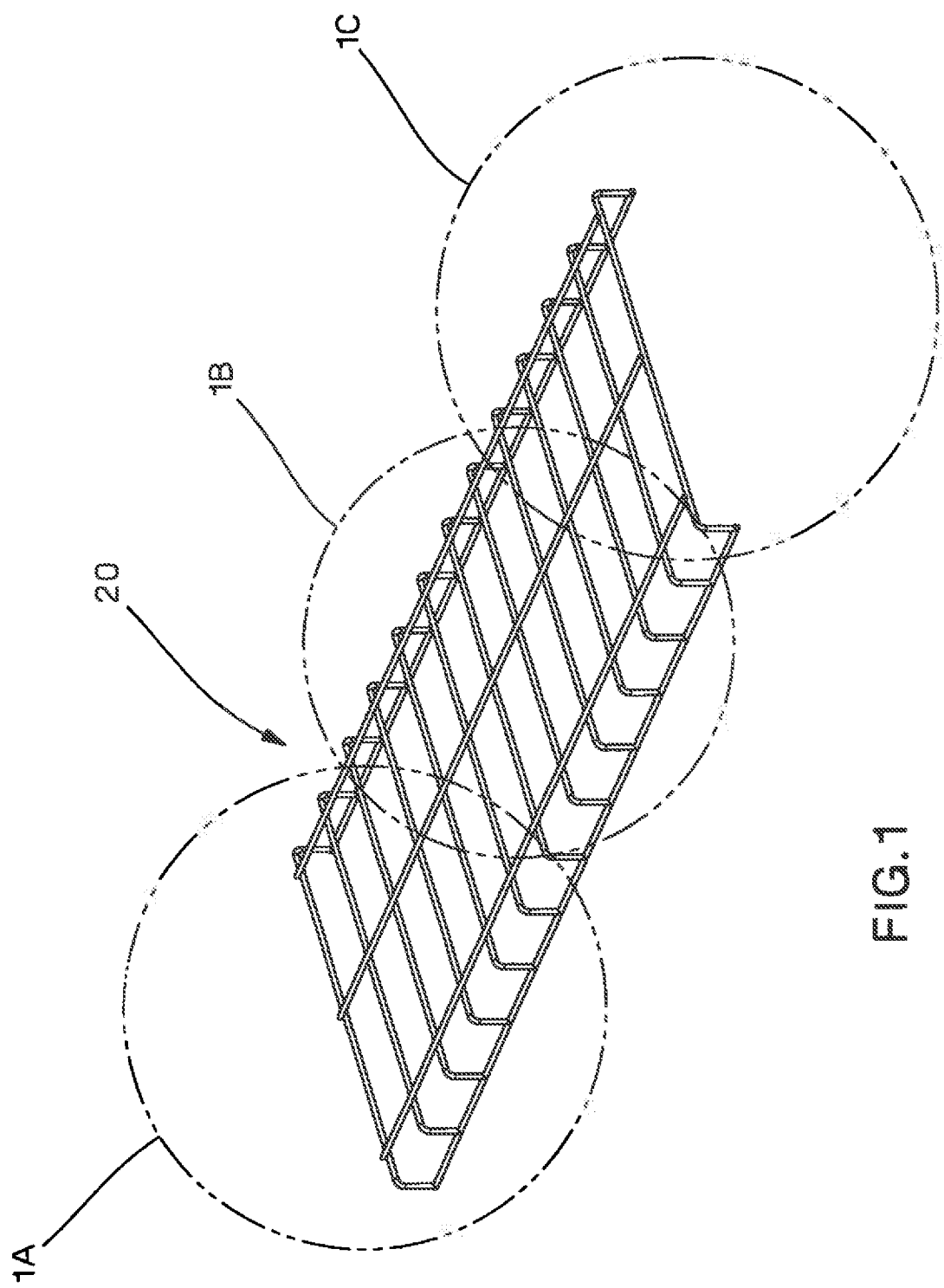
FIG. 1 illustrates a top perspective view of the telescoping wire cable tray system of the present invention.
Figure 1A:
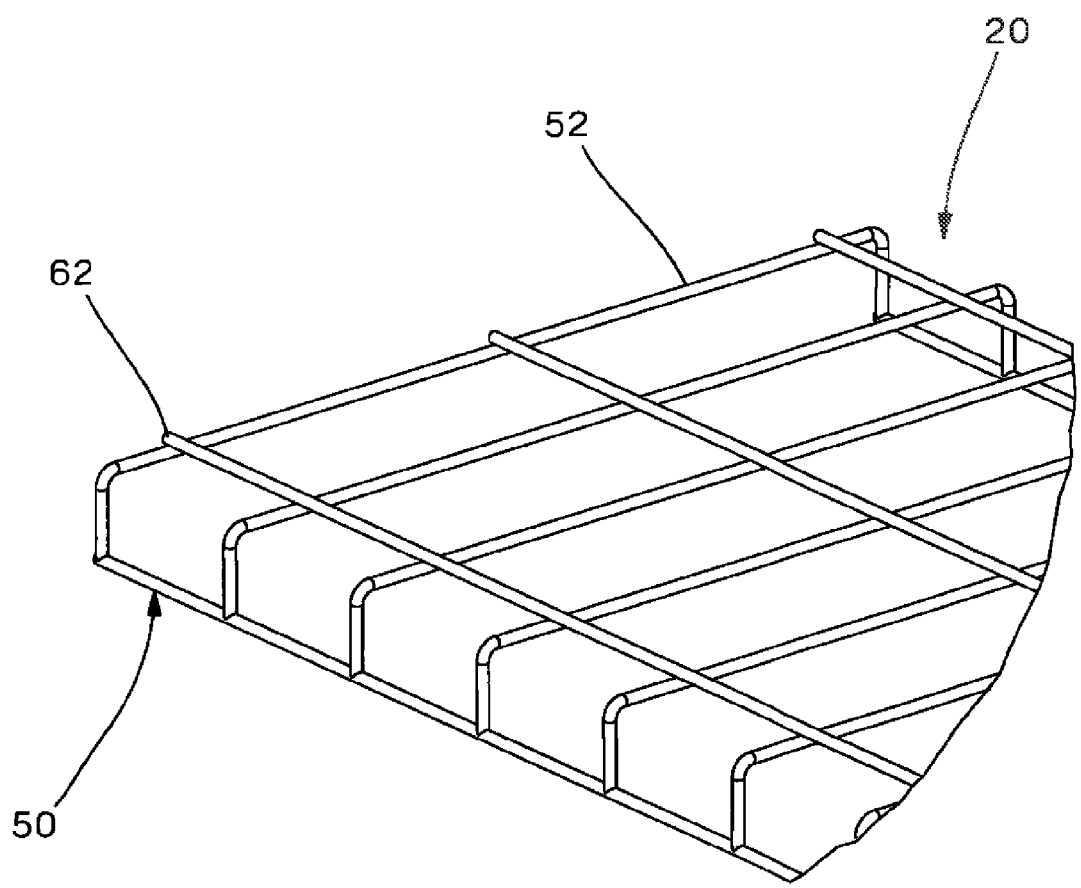
FIG. 1A illustrates a detailed view of section A of the telescoping wire cable trays of FIG. 1.
Figure 1B:
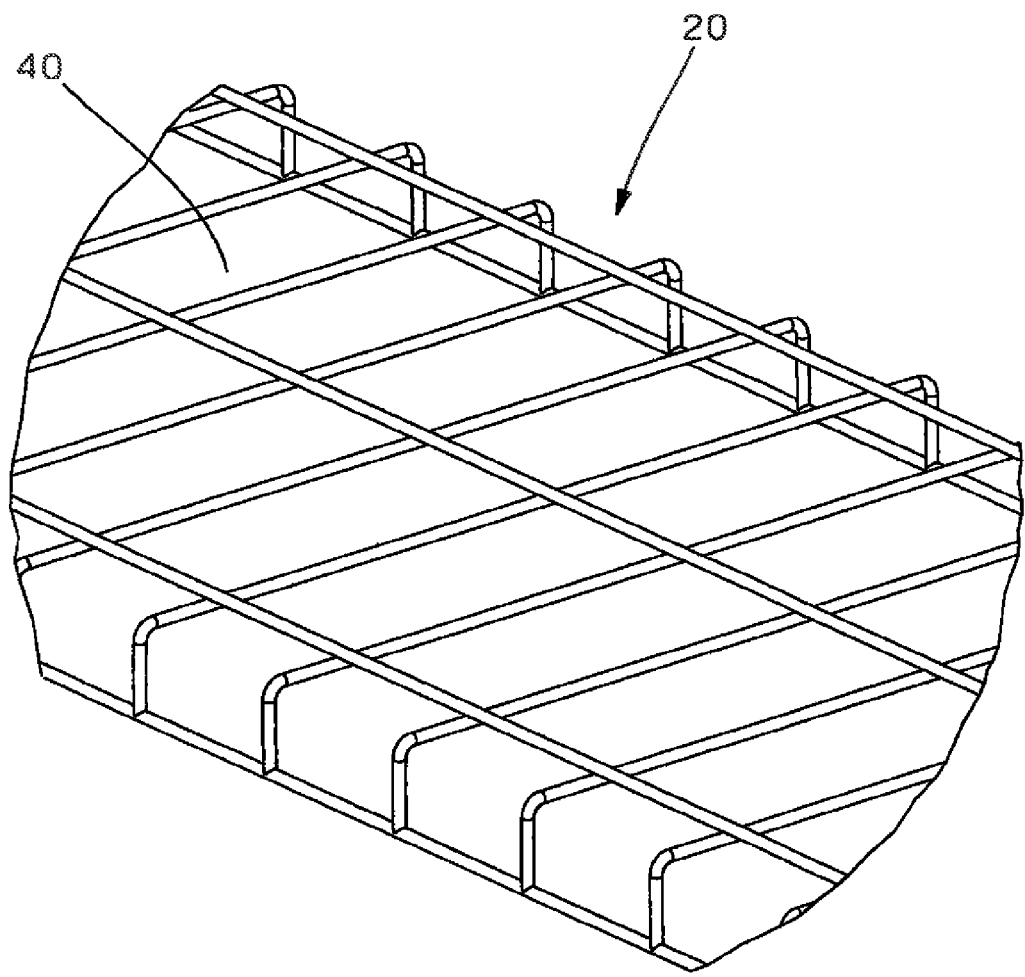
FIG. 1B illustrates a detailed view of section B of the telescoping wire cable trays of FIG. 1.
Figure 1C:
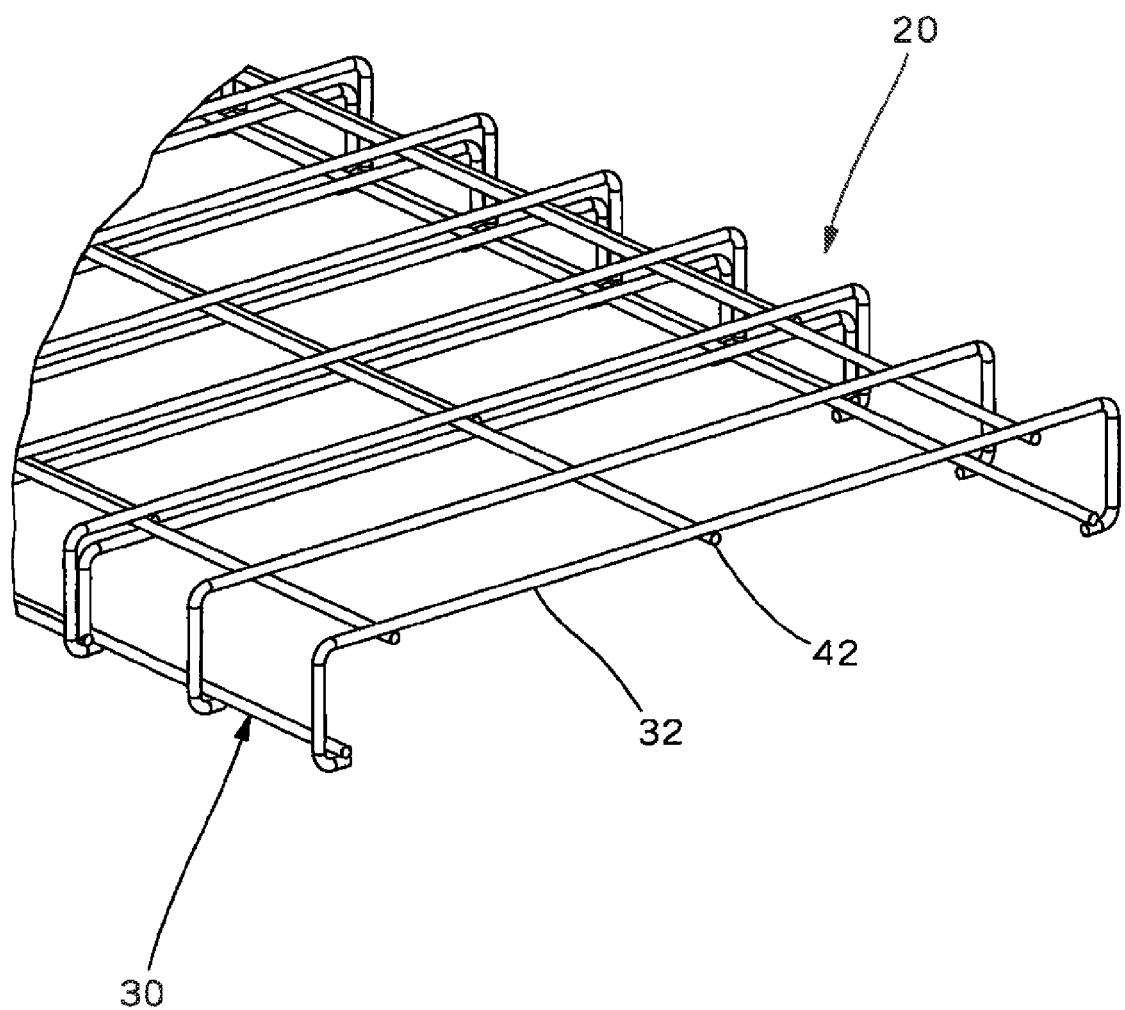
FIG. 1C illustrates a detailed view of section C of the telescoping wire cable trays of FIG. 1.

FIGS. 1-4 illustrate the telescoping wire cable tray system 20 of the present invention. As best seen in FIGS. 1A-C, the telescoping wire cable tray system 20 includes an outer wire cable tray 30 and an inner wire cable tray 50. Each wire cable tray includes a plurality of transverse wires 32, 52 and a plurality of longitudinal wires 42, 62. The transverse wires 32, 52 form a generally flat top 40 for supporting cables routed in the wire cable tray system 20.

Figure 4:
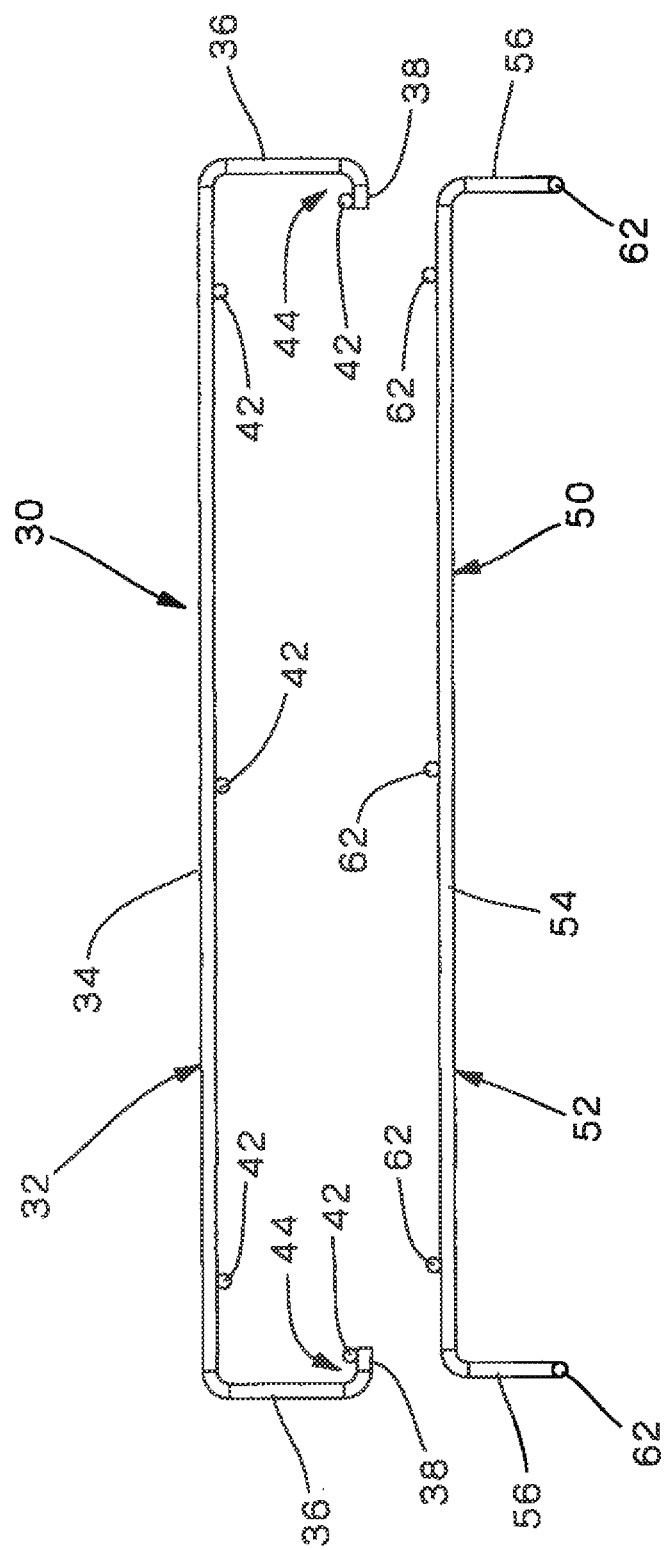
FIG. 4 illustrates end views of the outer wire cable tray and the inner wire cable tray of the telescoping wire cable trays of FIG. 2.
Figure 5A:
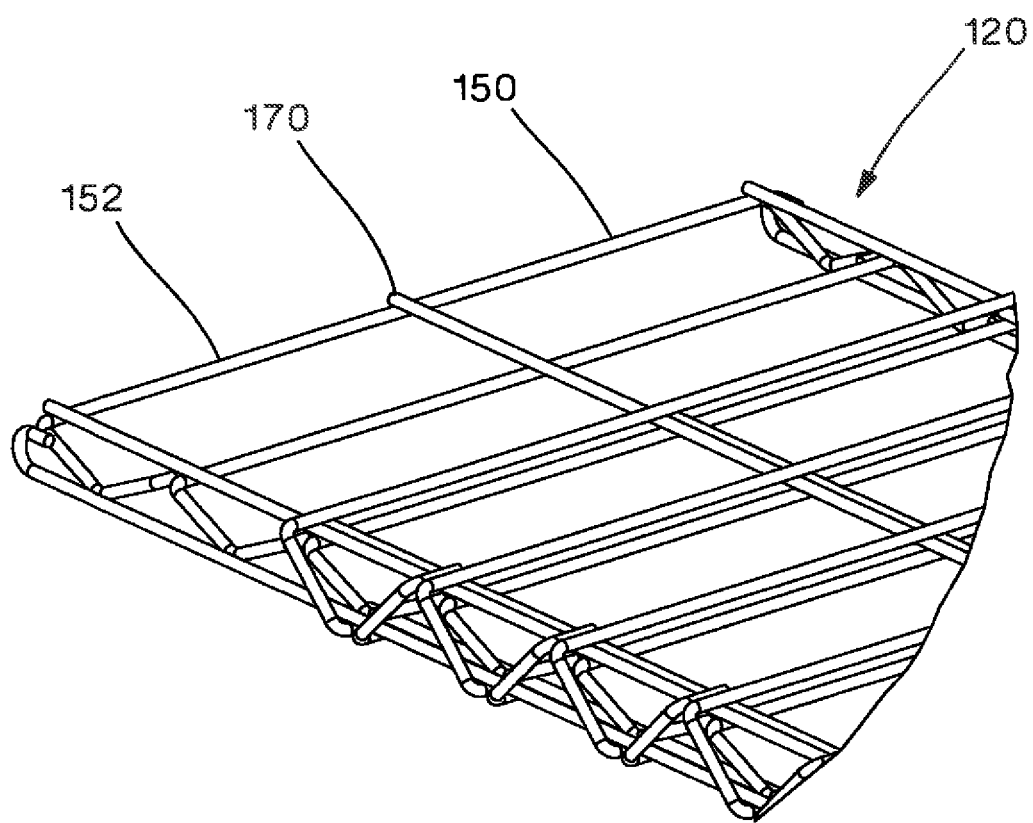
FIG. 5A illustrates a detailed view of section A of the telescoping wire cable trays of FIG. 5.
Figure 5B:
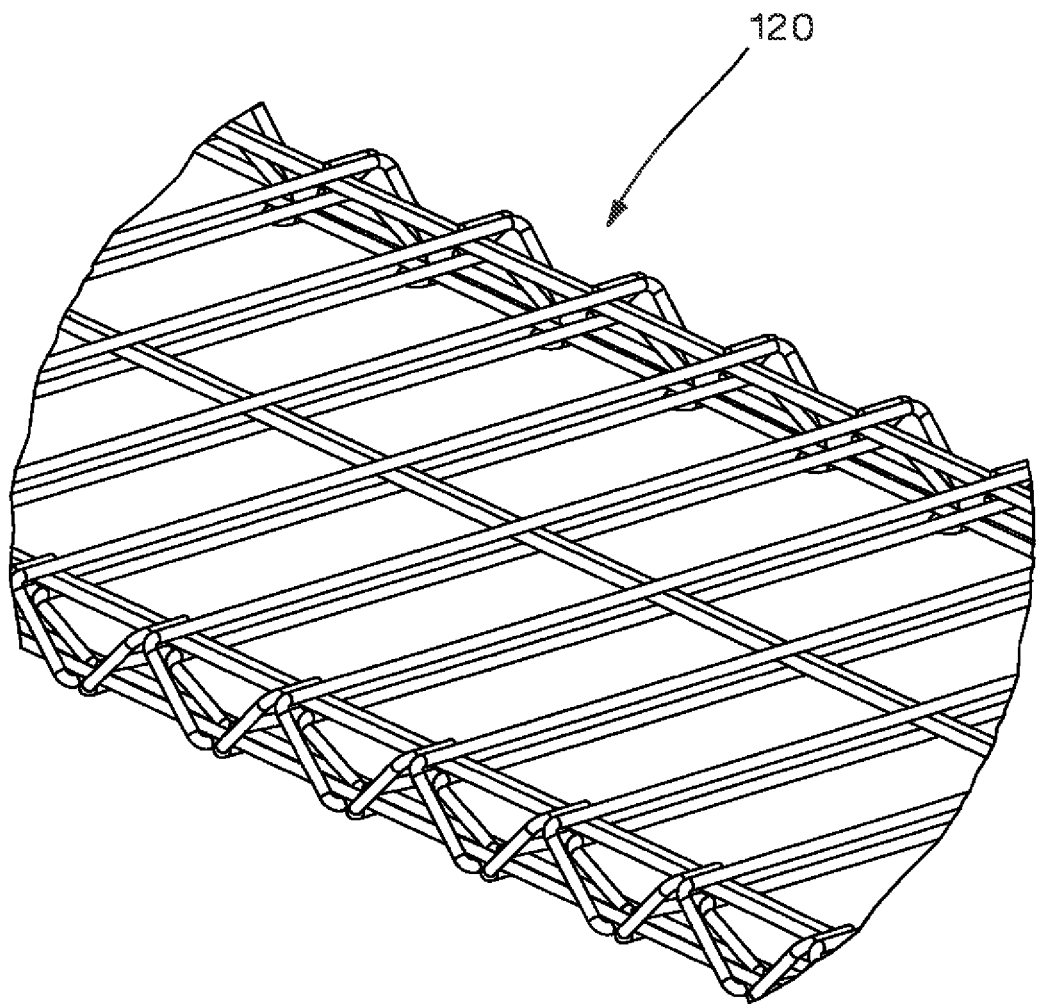
FIG. 5B illustrates a detailed view of section B of the telescoping wire cable trays of FIG. 5.
Figure 5C:
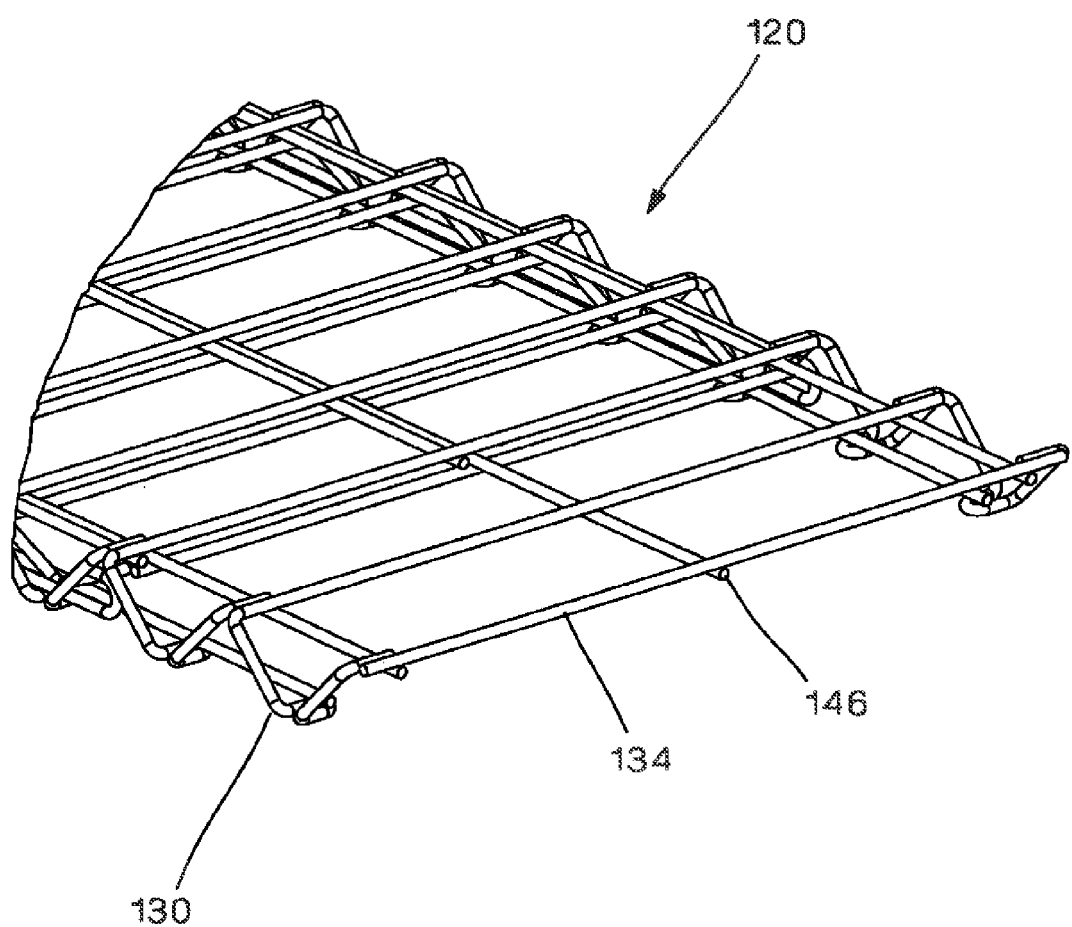
FIG. 5C illustrates a detailed view of section C of the telescoping wire cable trays of FIG. 5.
Figure 6:
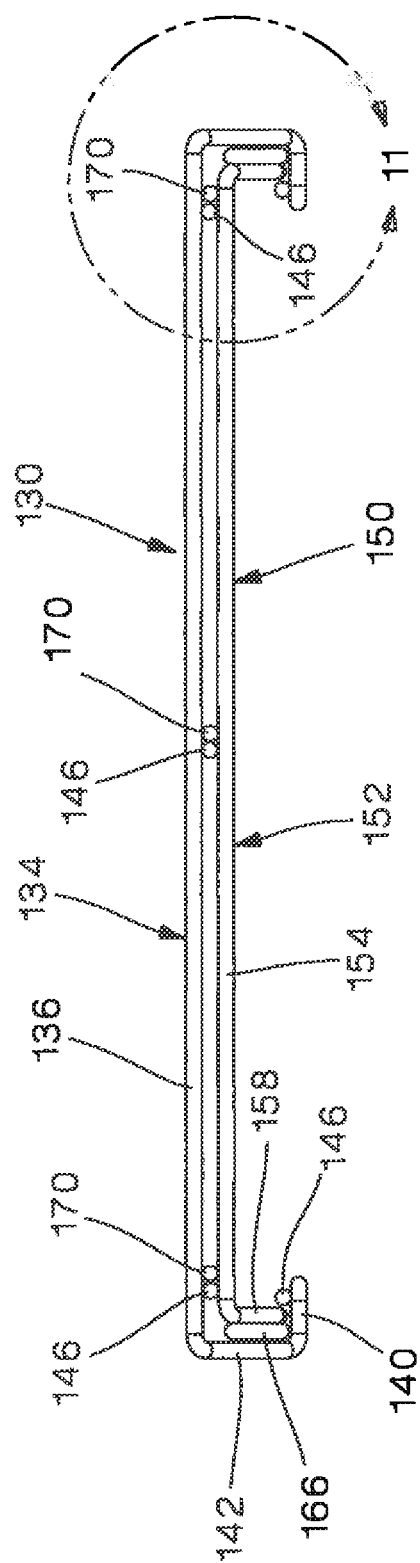
FIG. 6 illustrates an end view of the telescoping wire cable trays of FIG. 5.

As illustrated in FIG. 4, each transverse wire 32 of the outer wire cable tray 30 includes a top portion 34, side walls portions 36 and bottom portions 38. The outer wire cable tray 30 includes longitudinal wires 42 positioned underneath the top portion 34 of the transverse wires 32. The three longitudinal wires 42 are parallel and are positioned an equal distance apart, and they provide support to the transverse wires 32. A longitudinal wire 42 is also positioned above each bottom portion 38 of the transverse wires 32 at the end of the transverse wires 32 thereby forming a slot or track 44 between the side walls 36 of the transverse wires 32 and the longitudinal wire 42.

The transverse wires 52 of the inner wire cable tray 50 include a top portion 54 and side walls 56. The inner wire cable tray 50 includes three parallel longitudinal wires 62 positioned above the transverse wires 52 and a longitudinal wire 62 positioned at the end of each side wall 56 of the transverse wires 52.

Figure 2:
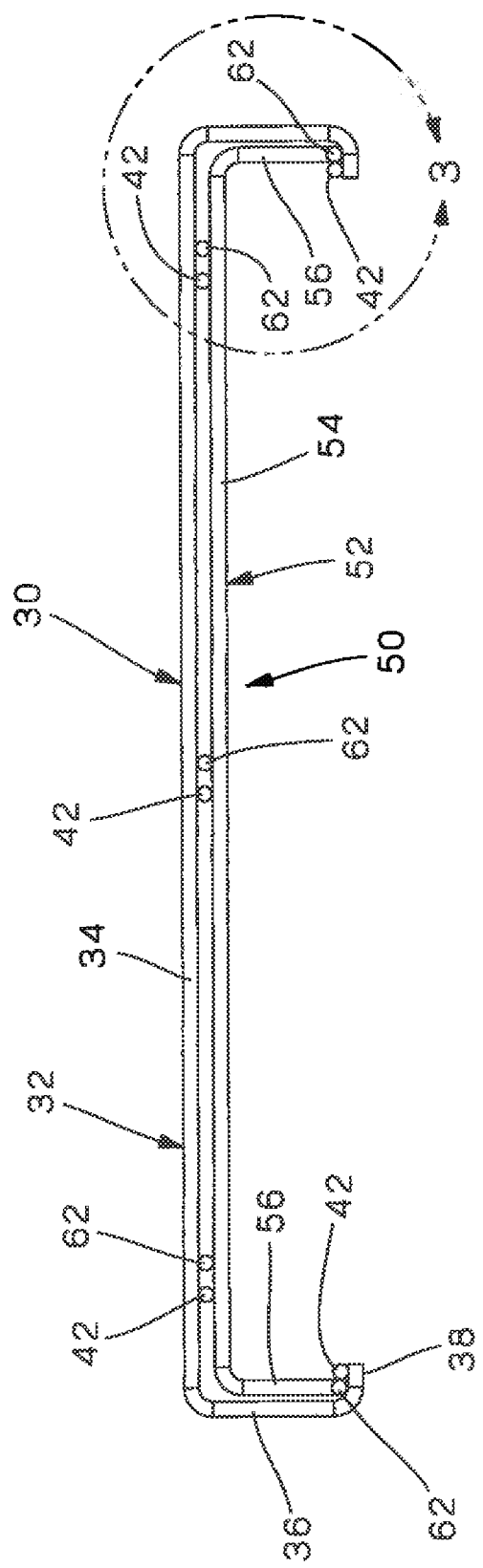
FIG. 2 illustrates an end view of the telescoping wire cable trays of FIG. 1.
Figure 3:
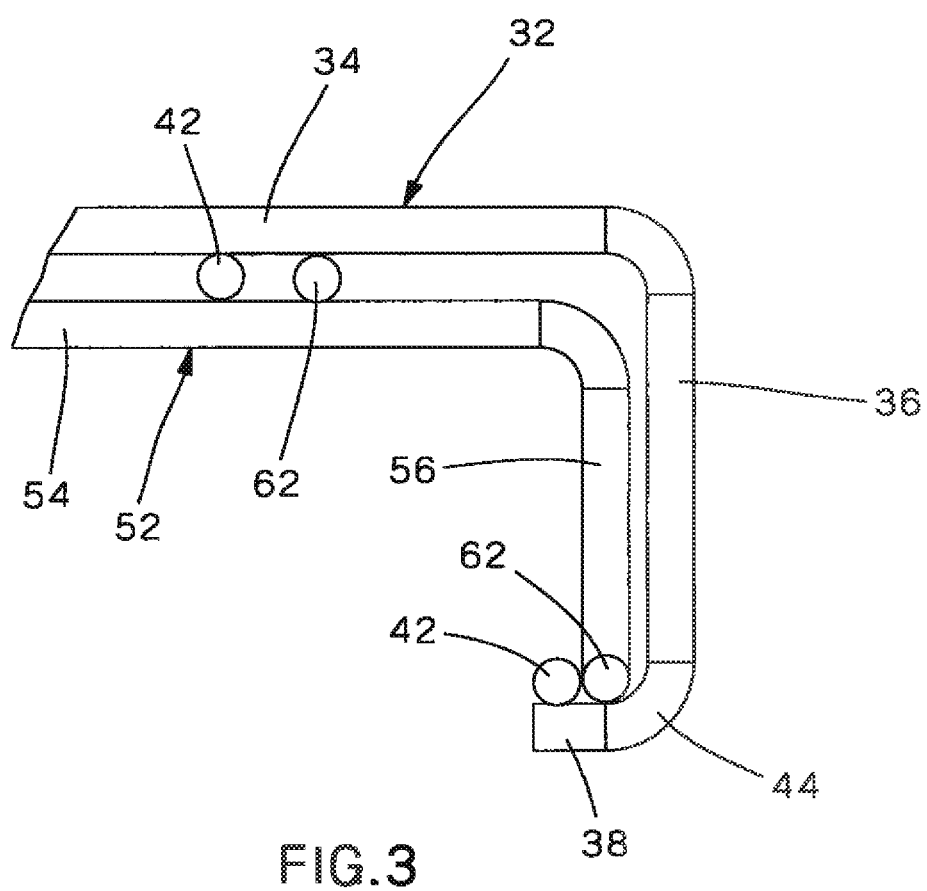
FIG. 3 illustrates a detailed view of section A of the telescoping wire cable trays of FIG. 2.

As illustrated in FIGS. 2-3, when the inner wire cable tray 50 is positioned in the outer wire cable tray 30, the longitudinal wires 62 of the inner wire cable tray 50 and the longitudinal wires 42 of the outer wire cable tray 30 are positioned adjacent to each other allowing the wire cable trays to slide or telescope with respect to each other to adjust the length of the wire cable tray system. As best seen in FIG. 3, the longitudinal wires 62 at the end of the transverse wires 52 of the inner wire cable tray 50 are positioned in the slot or track 44 formed by the longitudinal wires 42 and the side walls 36 of the transverse wires 32 thereby restricting the relative lateral movement of the wire cable trays as the wire cable trays telescope with respect to each other.

In one embodiment, the outer and inner wire cable trays are designed with a 100 mm×9.5 in. grid spacing to enable the wire cable tray openings to align with cabinet top openings in a line of standard cabinets of various standard widths. Typically, there are three standard widths of data center cabinets. Each of these standard widths is a multiple of the distance between transverse wires of the wire cable tray. For example, the wire cable tray system openings approximately align with Panduit's NET-ACCESST™ cabinet top openings illustrated and described in U.S. Pat. No. 7,498,512.

FIGS. 5-12 illustrate the components and assembly of an alternative embodiment of the telescoping wire cable tray system 20, referred to as wire cable tray system 120. The wire cable tray system 120 includes truss style side walls to strengthen the structure of the wire cable trays.

Figure 7:
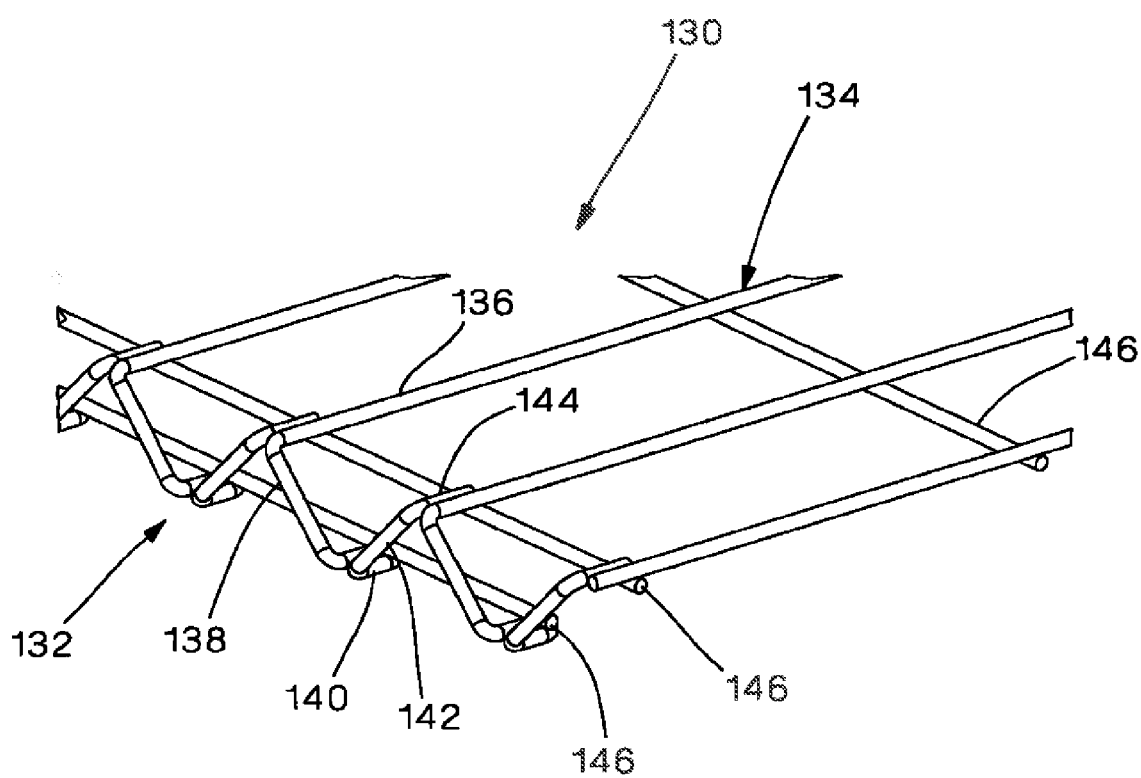
FIG. 7 illustrates a partial top perspective view of the outer wire cable tray of FIG. 5.
Figure 8:
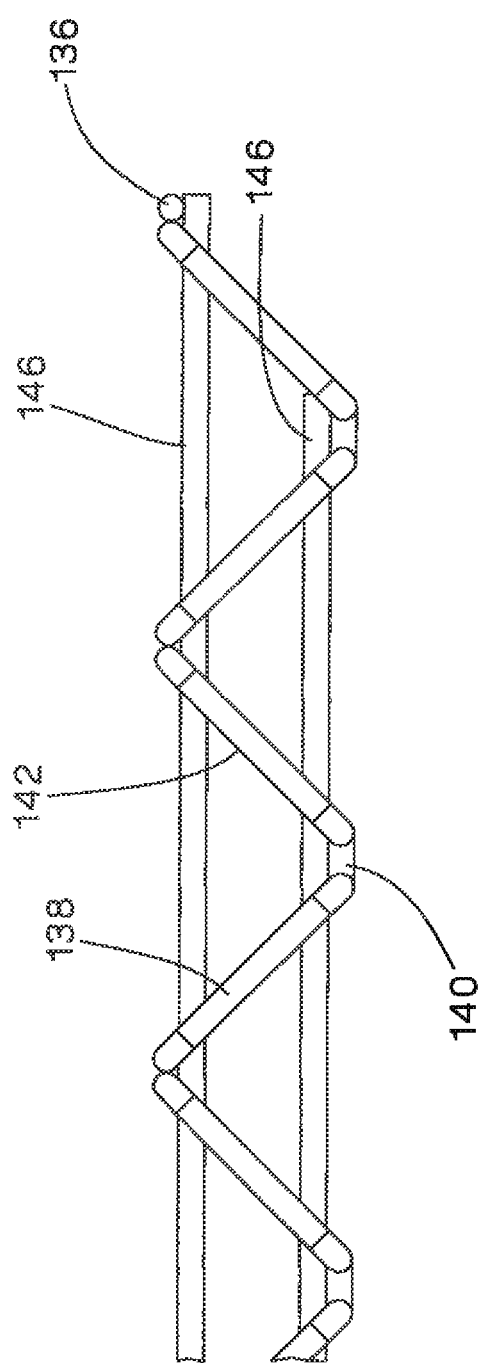
FIG. 8 illustrates a side view of the outer wire cable tray of FIG. 7.

FIGS. 7-8 illustrate the truss style side walls 132 of the outer wire cable tray 130 formed by the transverse wires 134. The transverse wires 134 include a top portion 136, a downwardly extending diagonal wall 138 which loops to form a flat bottom portion 140 and an upwardly extending diagonal wall 142 that ends with a transverse stub 144. Each transverse stub 144 is positioned adjacent to the top portion 136 of an adjacent transverse wire 134. The longitudinal wires 146 of the outer wire cable tray 130 are positioned underneath the top portion 136 of the transverse wires 134. A longitudinal wire 146 is also positioned at each end of the bottom portions 140 to form a slot or track 148 (see FIG. 12) between the side walls 132 of the transverse wires 134 and the longitudinal wire 146.

Figure 9:
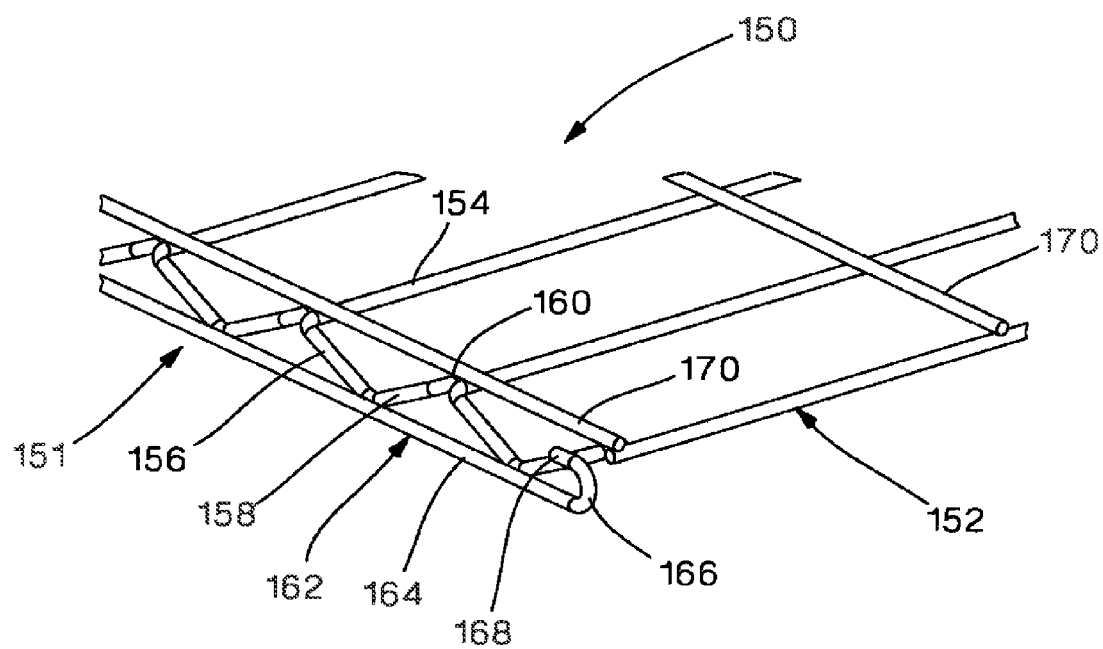
FIG. 9 illustrates a partial top perspective view of the inner wire cable tray of FIG. 5.
Figure 10:
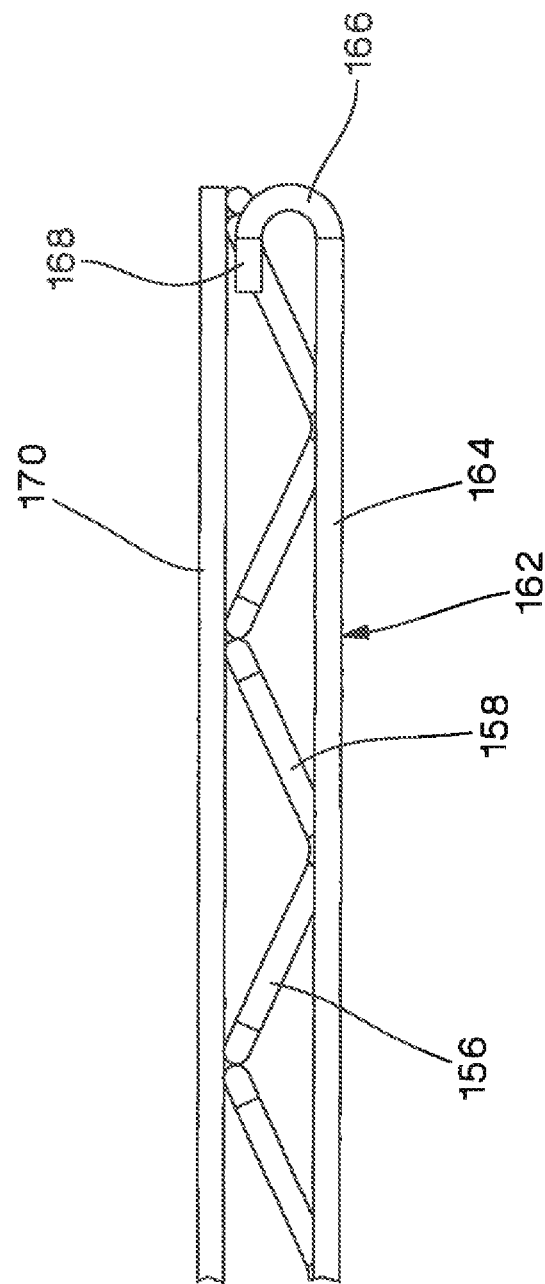
FIG. 10 illustrates a side view of the inner wire cable tray of FIG. 9.

FIGS. 9 and 10 illustrate the truss style side walls 151 of the inner wire cable tray 150 formed by the transverse wires 152 and a longitudinal side wire 162. The transverse wires 152 include a top portion 154, a downwardly extending wall 156 and an upwardly extending wall 158 ending in a stub 160. Each stub 160 is positioned adjacent to the top portion 154 of an adjacent transverse wire 152.

Figure 11:
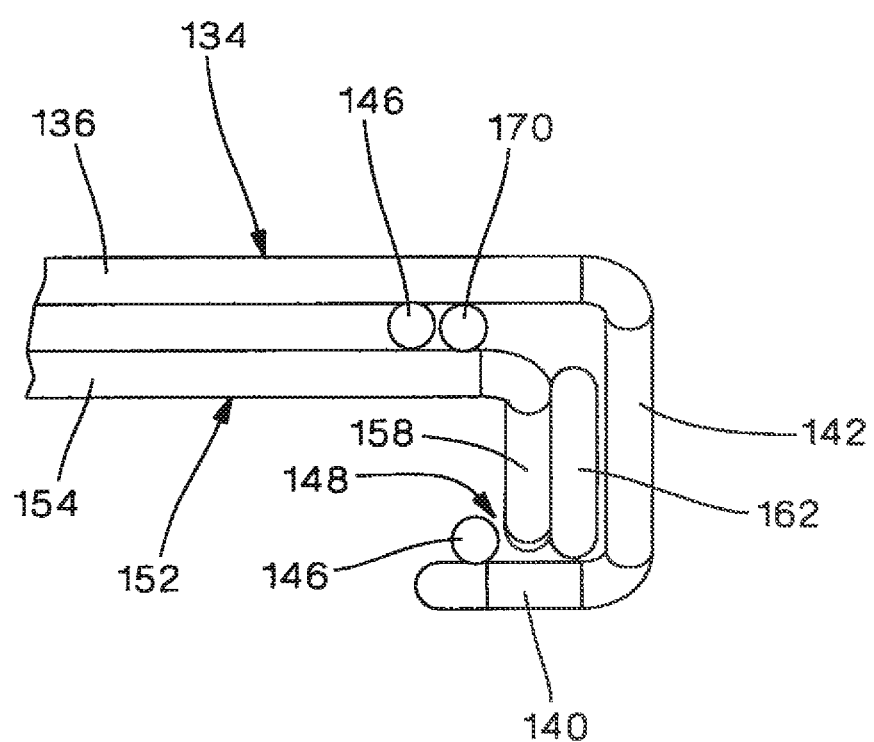
FIG. 11 illustrates a detailed view of section B of the telescoping wire cable trays of FIG. 6.
Figure 12:
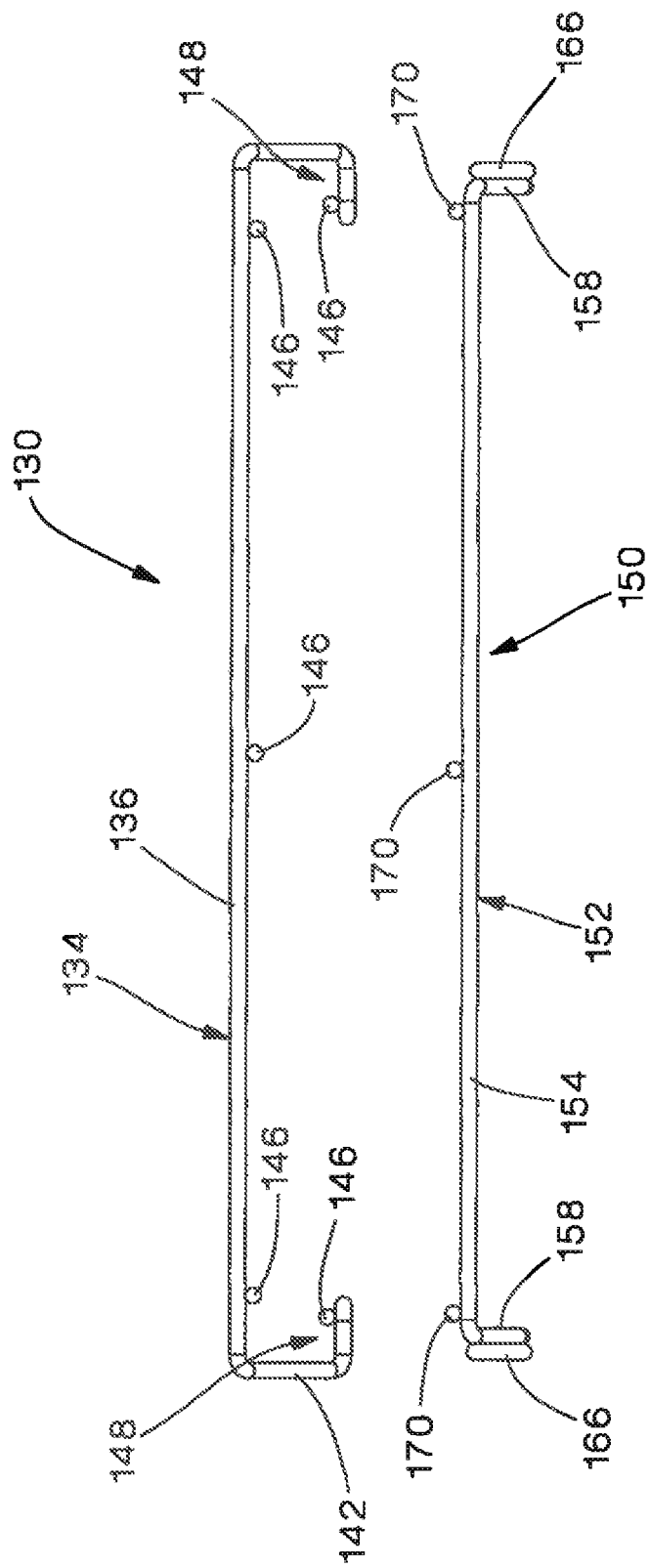
FIG. 12 illustrates end views of the outer wire cable tray and the inner wire cable tray of the telescoping wire cable trays of FIG. 6.

The longitudinal side wire 162 is positioned adjacent to the intersection of the downwardly extending wall 156 and the upwardly extending wall 158. The longitudinal side wire 162 includes a bottom portion 164, a curved portion 166 and a top portion 168. The bottom portion 164 of the longitudinal side wire 162 generally extends the length of the inner wire cable tray 150. As illustrated in FIG. 11, the longitudinal side wire 162 is designed to slide in the slot or track 148 to provide a smooth telescoping action over the outer wire cable tray 130.

The inner wire cable tray 150 also includes longitudinal wires 170 that are positioned above the top portion 154 of the transverse wires 152.

Figure 13:
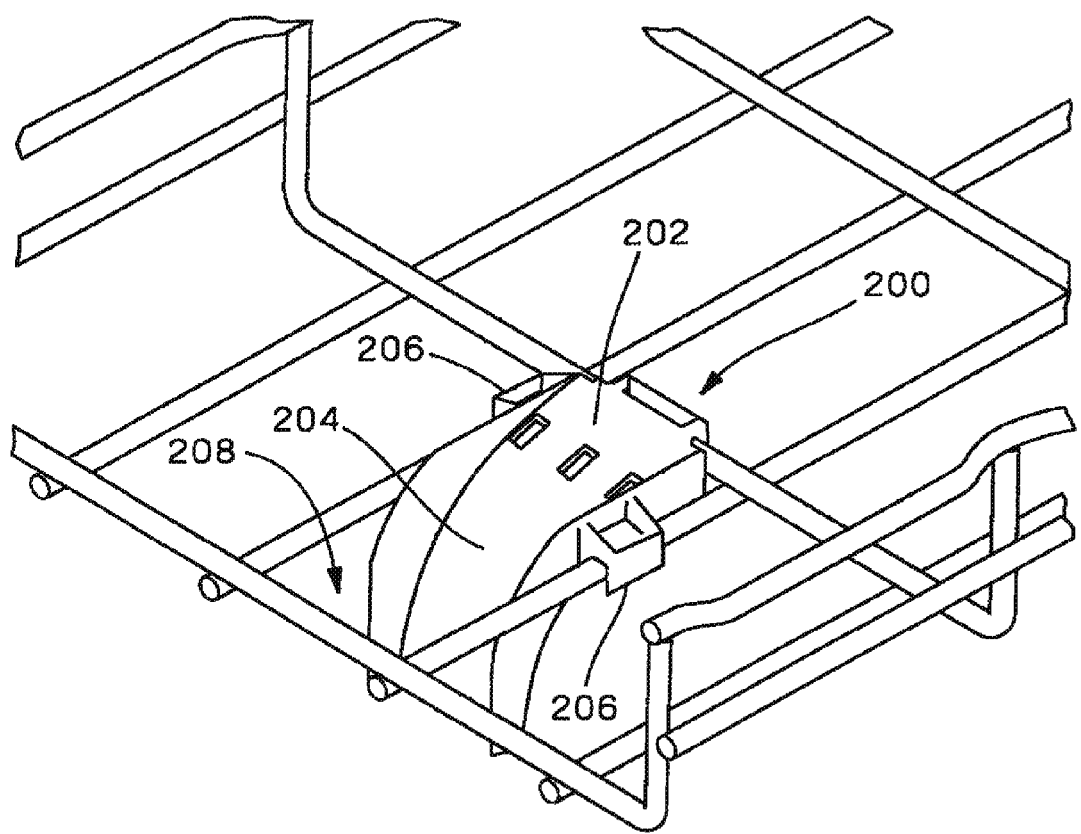
FIG. 13 illustrates a prior art bend radius downspout fitting for a wire cable tray which does not provide bend radius control above the cable tray.

FIG. 13 illustrates a prior art bend radius downspout fitting 200 including a top portion 202 with a bend radius portion 204 extending from one end. The bend radius fitting 200 includes snaps 206, and the bend radius fitting 200 snaps onto adjacent longitudinal wires to cover the area between adjacent transverse wires. The bend radius portion 204 extends downward into an open area 208 between the transverse wires. As a result, the bend radius portion 204 reduces the available open area 208 for cables to exit the wire cable tray system.

Figure 14:
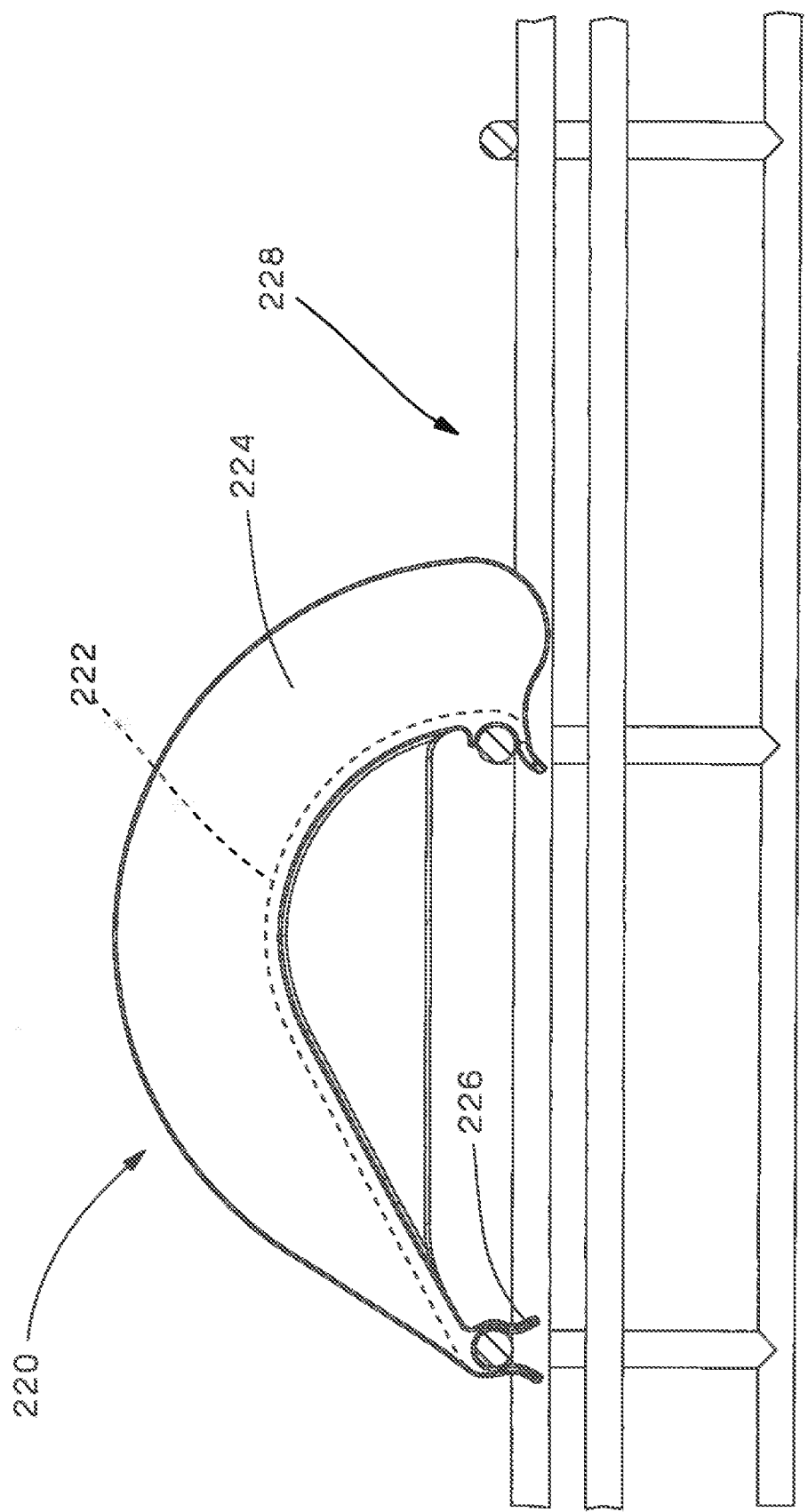
FIG. 14 illustrates a side view of a bend radius downspout fitting for the wire cable tray system of the present invention.
Figure 15:
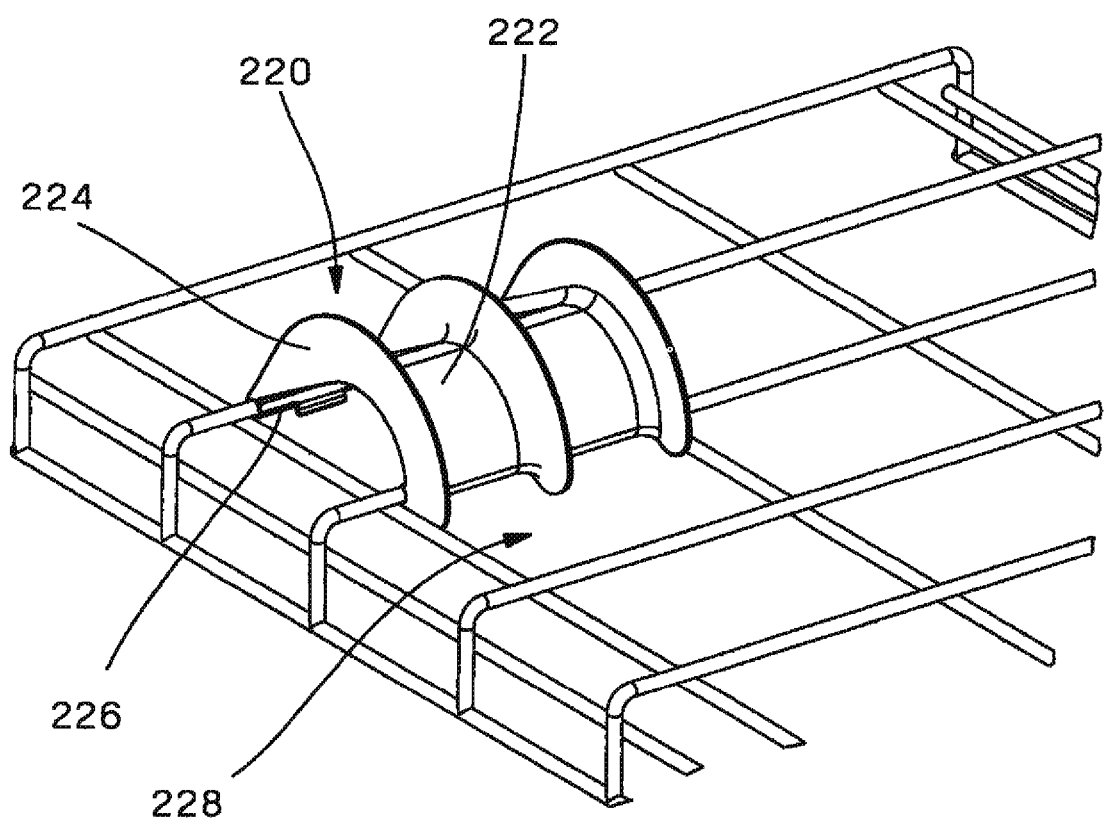
FIG. 15 illustrates a top perspective view of two bend radius fittings of FIG. 14 installed adjacent each other in one grid space on a wire cable tray.
Figure 16:
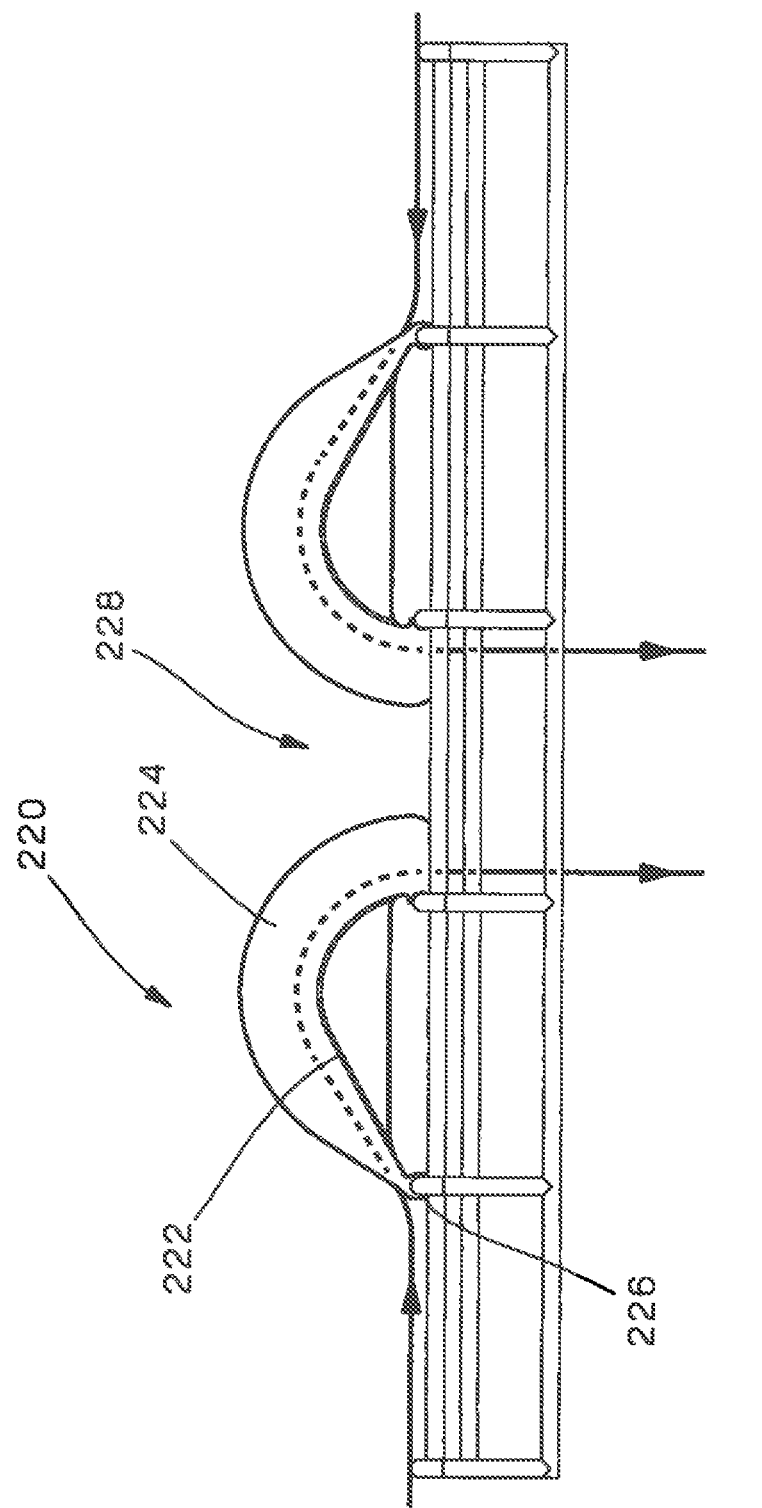
FIG. 16 illustrates a side view of two bend radius fittings of FIG. 14 installed on a wire cable tray.

FIGS. 14-16 illustrate a bend radius fitting 220 for the wire cable tray system. The bend radius fitting 220 includes a bend radius portion 222, two side flanges 224 and two snap features 226 positioned along the bottom of the bend radius fitting 220. The bend radius fitting 220 is snapped onto adjacent transverse wires. As best seen in FIG. 15, the bend radius fitting 220 does not extend into the open area 228, thus the entire open area 228 is available for cables exiting the wire cable tray system. FIG. 16 illustrates cables routed from opposite directions and descending through a common open area 228 in the wire cable tray system.

The bend radius fitting 220 provides maximum space to route cables and cable connectors through an open area in the wire cable tray while minimizing the spacing between transverse wires in the wire cable tray, which minimizes the sag between the transverse wires of cables supported by the wire cable tray. The bend radius fitting 220 also increases the number of options for longitudinal locations of downspouts in the wire cable tray system.

Figure 17:
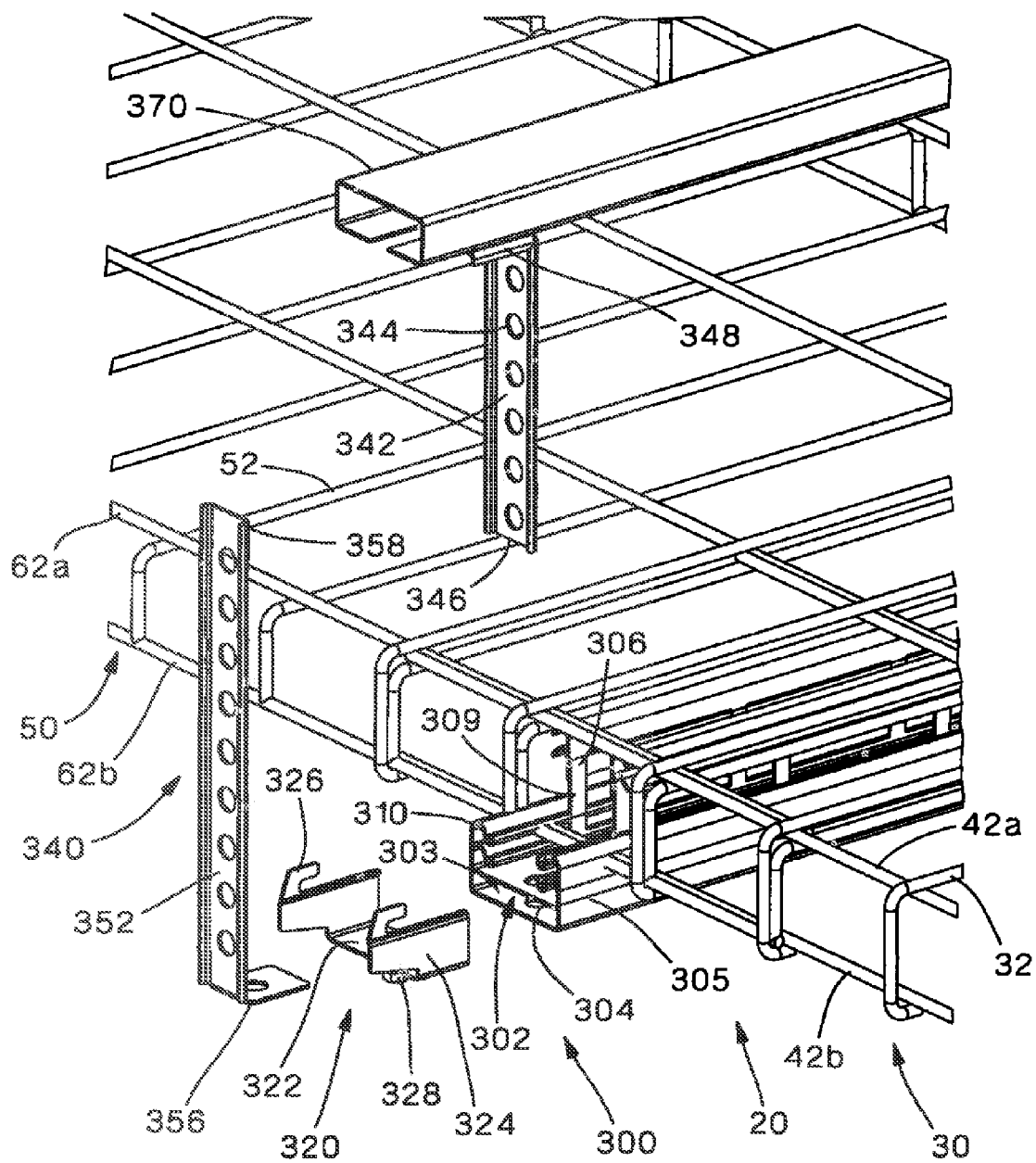
FIG. 17 illustrates an exploded perspective view of the telescoping wire cable trays of FIG. 1 to be installed on a trapeze support bar and connected to a ceiling member by a hanger bar.
Figure 18:
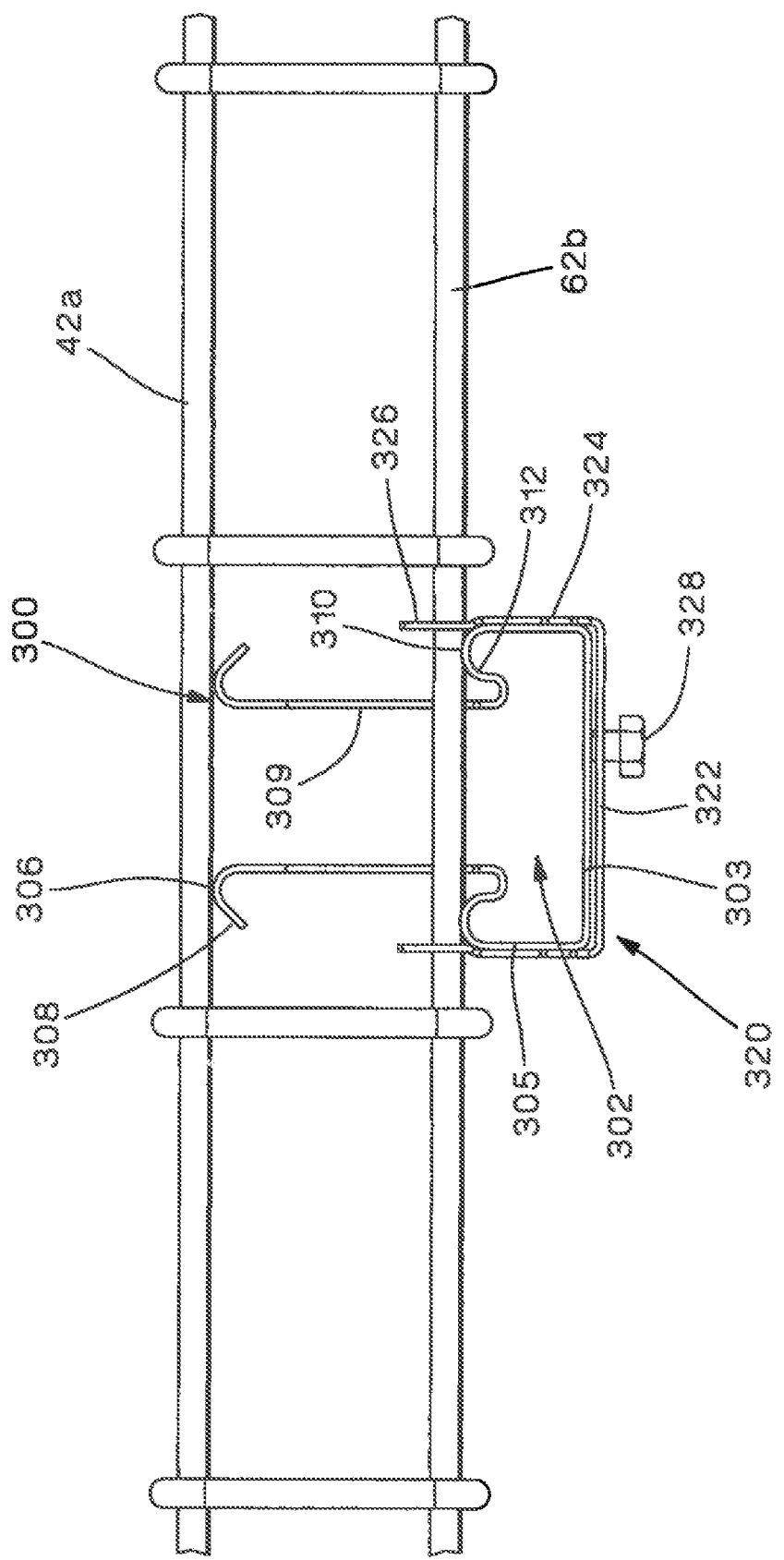
FIG. 18 illustrates a side view of the trapeze support bar and locking clip of FIG. 17 secured to the telescoping wire cable trays.
Figure 19:
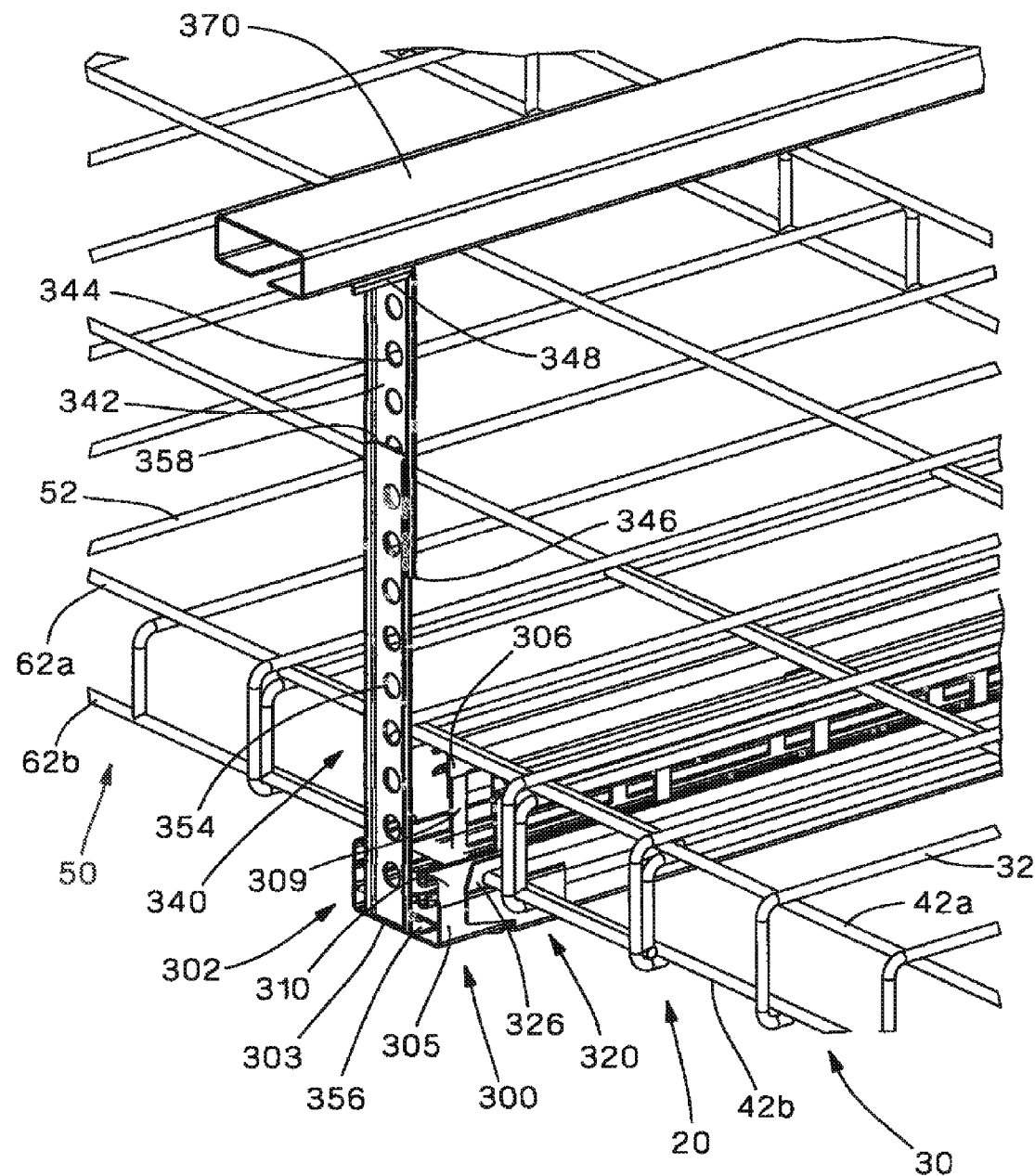
FIG. 19 illustrates a perspective view of the telescoping wire cable trays of FIG. 17 installed on the trapeze support bar and connected to the ceiling member by the hanger bar.

FIGS. 17-19 illustrate a trapeze support bar 300 and a hanger bar 340 that support the telescoping wire cable tray system 20 suspended from ceiling member 370. Although FIGS. 17-19 illustrate the overlapping wire cable trays of FIG. 1B attached to the trapeze support bar 300, the trapeze support bar 300 and the hanger bar 340 may also support the inner wire cable tray 50 of FIG. 1A and the outer wire cable tray 30 of FIG. 1C.

The trapeze support bar 300 includes a channel 302 defined by a bottom 303 having a hole 304 and side walls 305. The channel 302 also includes a lower support surface 310, support arms 309 and an upper support surface 306 that extend from the side walls 305. As illustrated in FIG. 18, the upper support surface 306 includes outwardly extending flanges 308 that support the upper longitudinal wires 42a, 62a of the overlapping outer and inner wire cable trays 30, 50, respectively. The lower support surface 310 includes inwardly extending flanges 312 that support the lower longitudinal wires 42b, 62b of the overlapping outer and inner wire cable trays, 30, 50, respectively.

A locking clip 320 secures the wire cable trays to the trapeze support bar 300. The locking clip 320 includes a bottom member 322 with side walls 324 extending therefrom. Each side wall 324 includes a hook 326 for engaging the lower longitudinal wires 42b, 62b of the outer and inner wire cable trays 30, 50. The locking clip 320 slides over the trapeze support bar 300 until the hooks 326 engage the lower longitudinal wires 42b, 62b. A screw 328, or other fastener, secures the locking clip 320 to the trapeze support bar 300 and the outer and inner wire cable trays 30, 50.

The hanger bar 340 includes an upper hanger bar 342 and a lower hanger bar 352. The upper hanger bar 342 and the lower hanger bar 352 each include a plurality of holes 344, 354, respectively. A first end 356 of the lower hanger bar 352 is secured to the trapeze support bar 300 by a nut and a bolt. A second end 358 of the lower hanger bar 352 mates with a first end 346 of the upper hanger bar 342 so that the lower hanger bar 352 slides inside the upper hanger bar 342. The holes 344 in the upper hanger bar 342 and the holes 354 in lower hanger bar 352 align to receive a bolt to lock the upper hanger bar 342 and lower hanger bar 352 at a designated height position. A second end 348 of the upper hanger bar 342 is fastened to the ceiling member 370 to suspend the wire cable trays.

Figure 20:
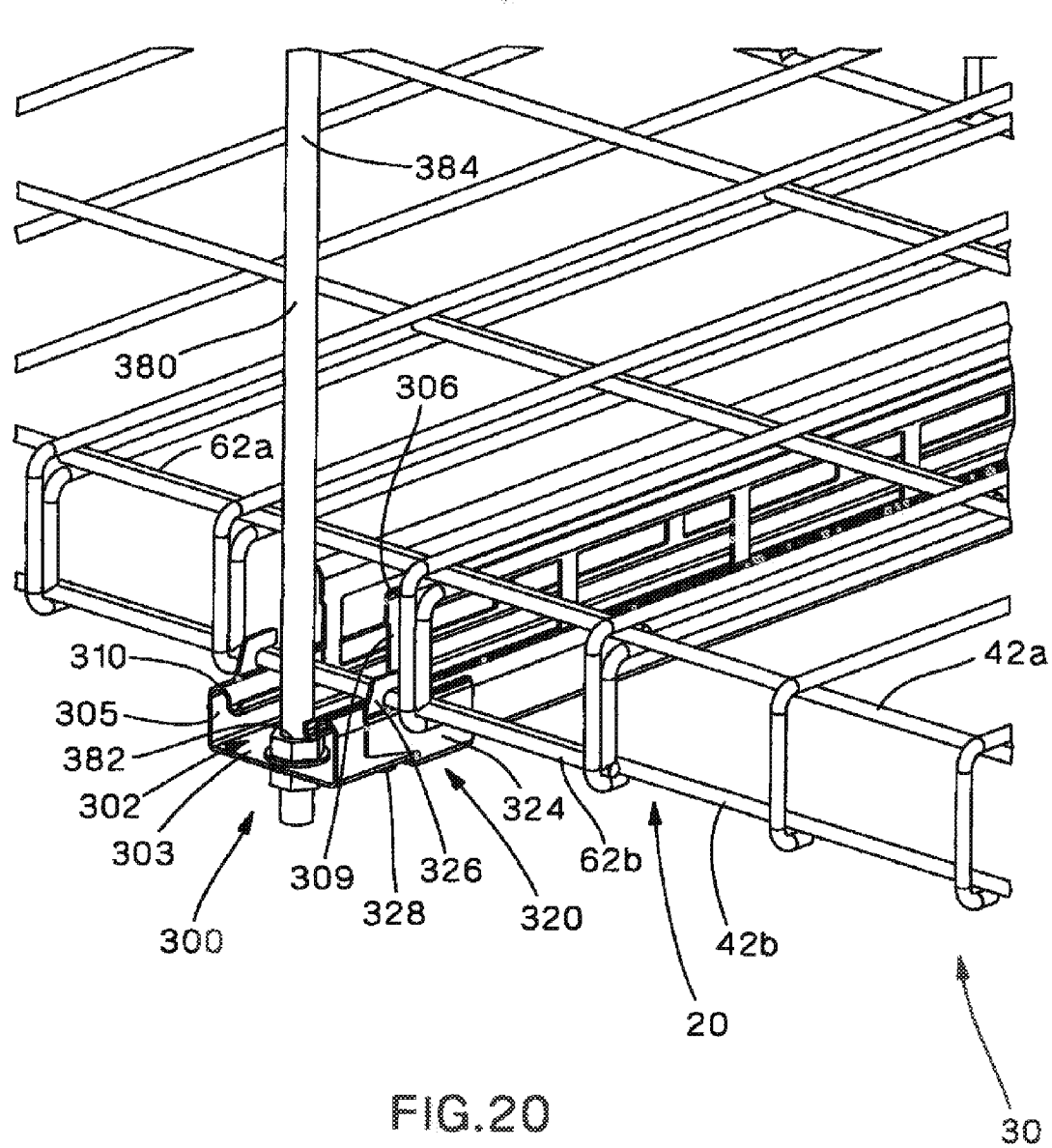
FIG. 20 illustrates a perspective view of the telescoping wire cable trays of FIG. 17 installed on the trapeze support bar and connected to a ceiling member by a threaded rod.

FIG. 20 illustrates the telescoping wire cable trays of the present invention installed on the trapeze support bar 300 and connected to a ceiling member by a threaded rod 380. The threaded rod 380 may be used as an alternative to the upper and lower hanger bars 342, 352 illustrated in FIGS. 17-19 to secure the telescoping wire cable trays to the ceiling member 370. A first end 382 of the threaded rod 380 is secured to the trapeze support bar 300 and a second end 384 of the threaded rod 380 is secured to a ceiling member.

FIGS. 21-26 illustrate a clamp 400 that is used to lock the overlapping outer wire cable tray 30 and the inner wire cable tray 50 of the telescoping wire cable tray system 20.

Figure 21:
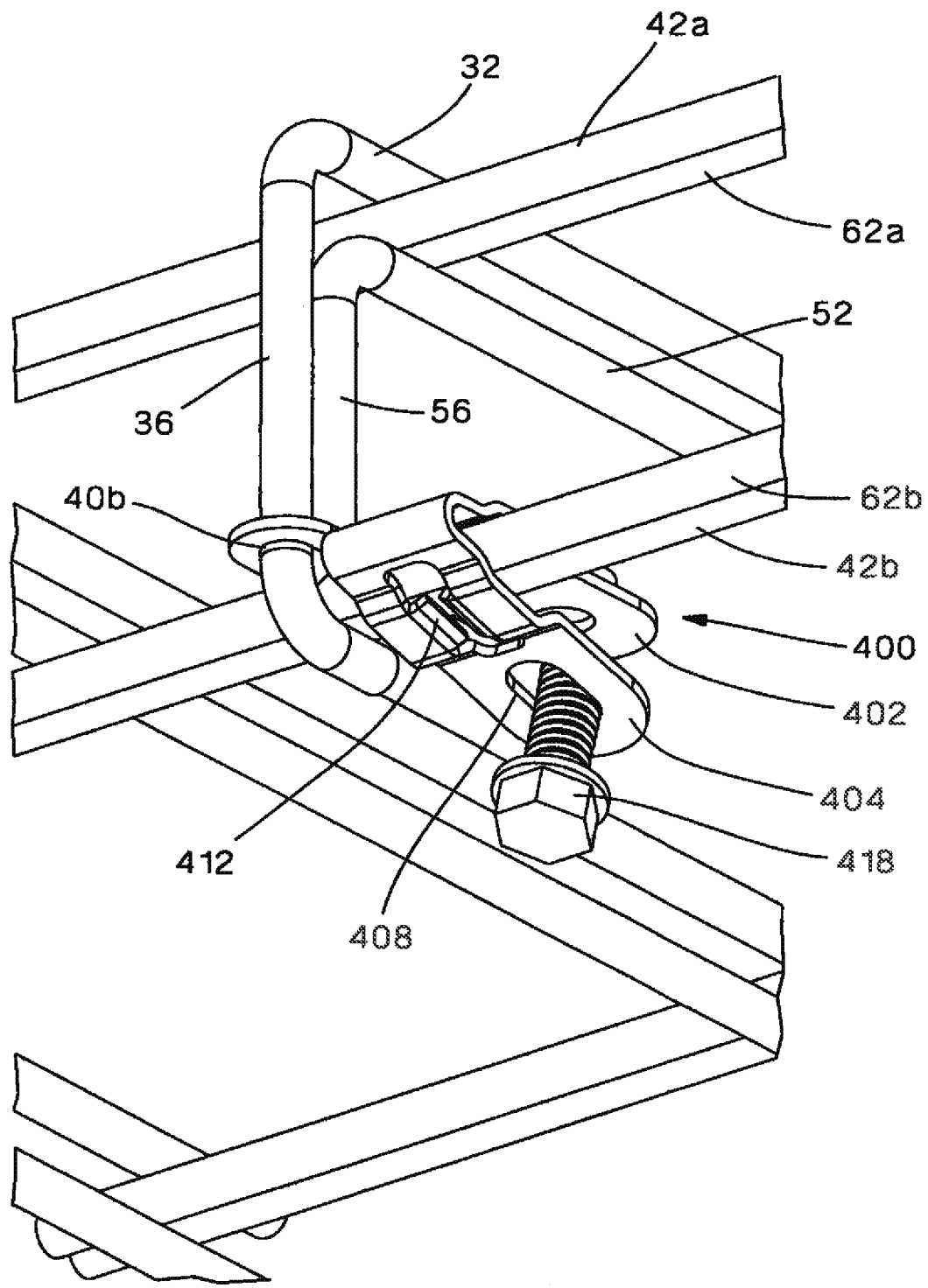
FIG. 21 illustrates a bottom perspective view of a clamp being installed on the overlapping wire cable trays of FIG. 1B.
Figure 22:
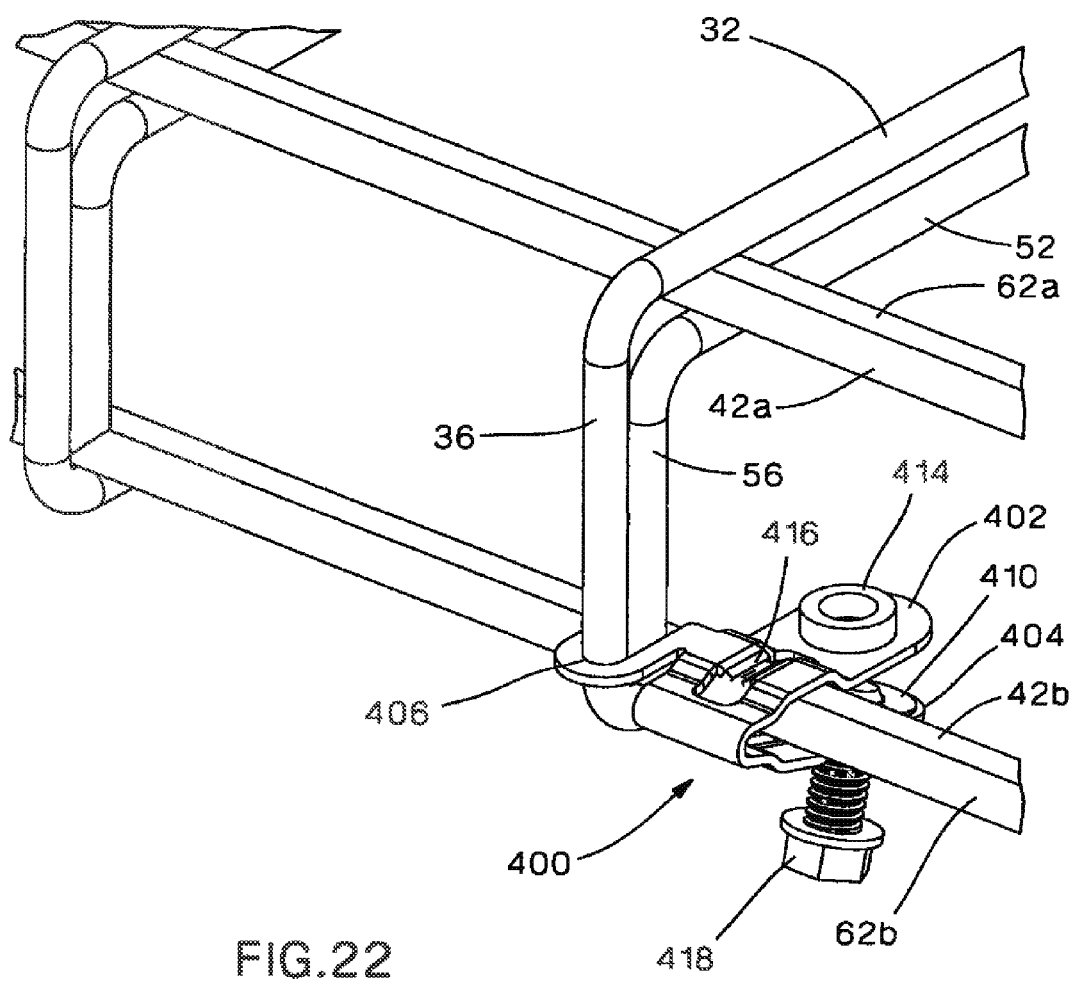
FIG. 22 illustrates a top perspective view of the clamp of FIG. 21 being installed on the overlapping wire cable trays.
Figure 23:
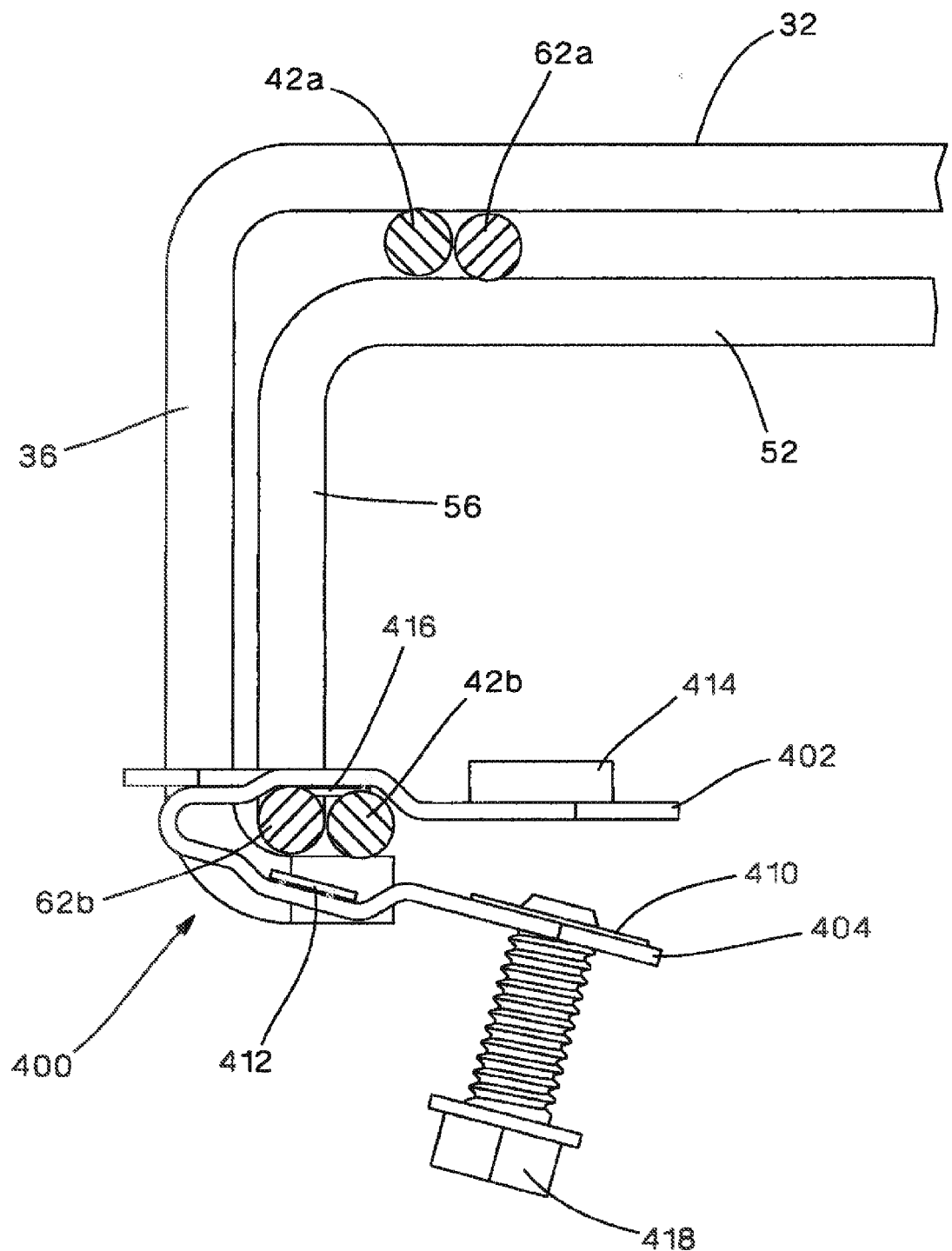
FIG. 23 illustrates a side view of the clamp of FIG. 21 being installed on the overlapping wire cable trays.
Figure 24:
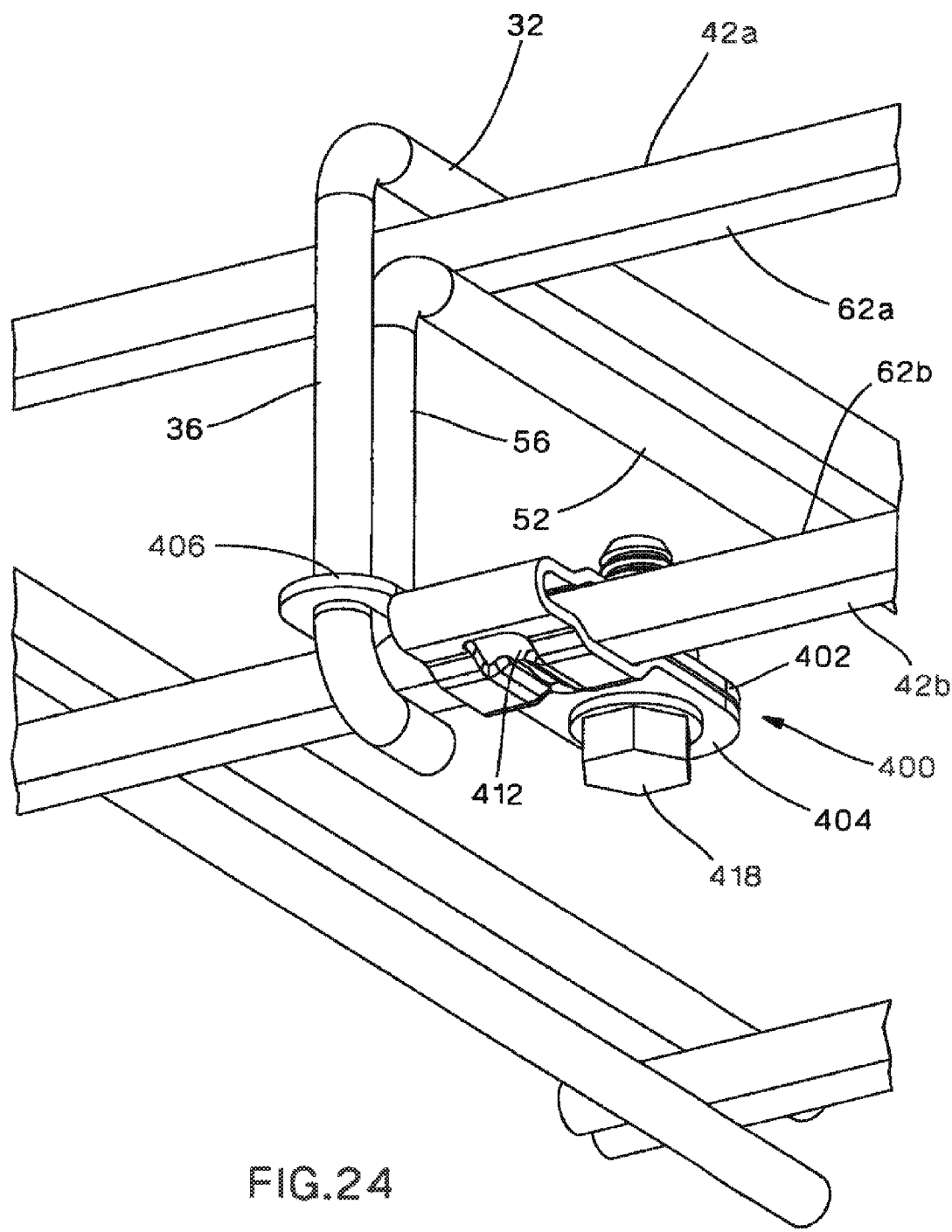
FIG. 24 illustrates a bottom perspective view of the clamp of FIG. 21 installed on the overlapping wire cable trays.
Figure 25:
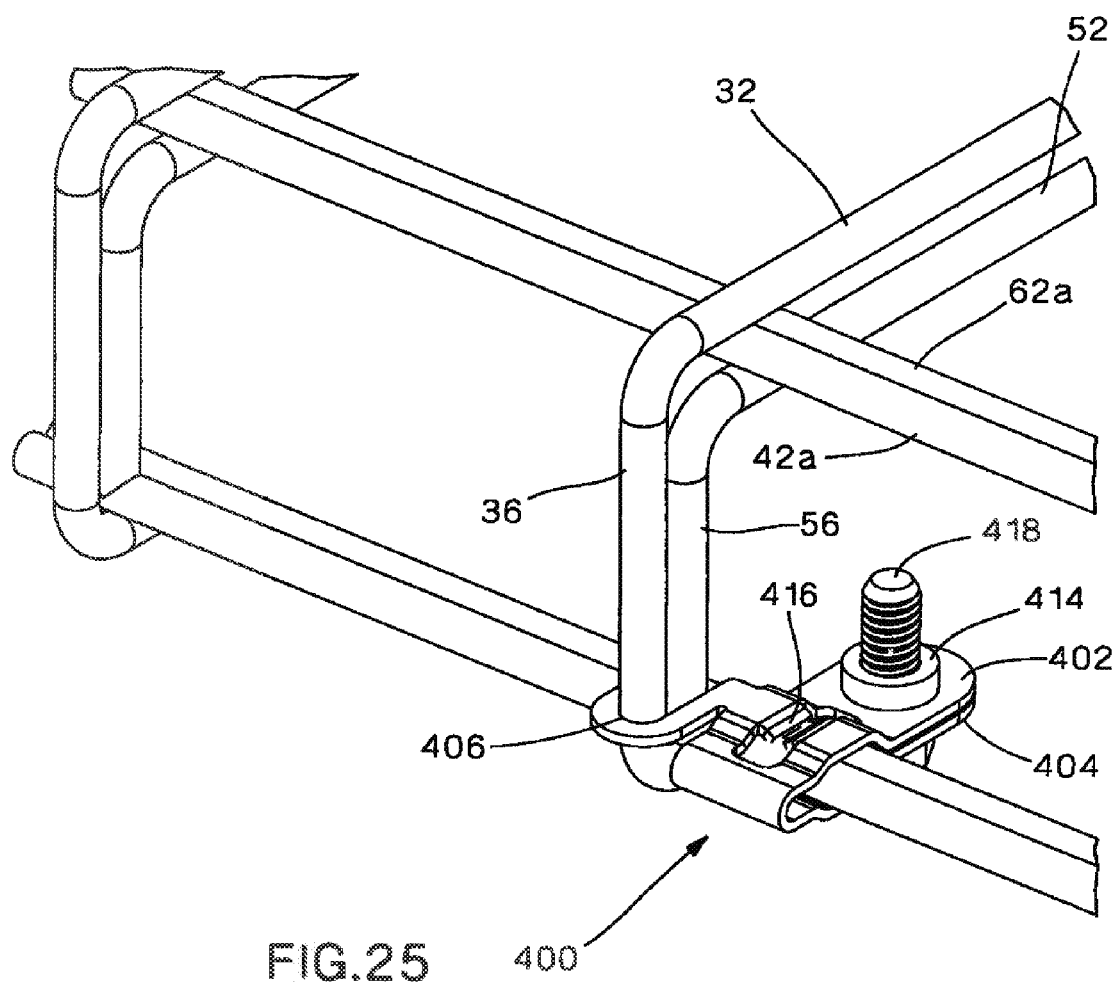
FIG. 25 illustrates a top perspective view of the clamp of FIG. 24 installed on the overlapping wire cable trays.
Figure 26:
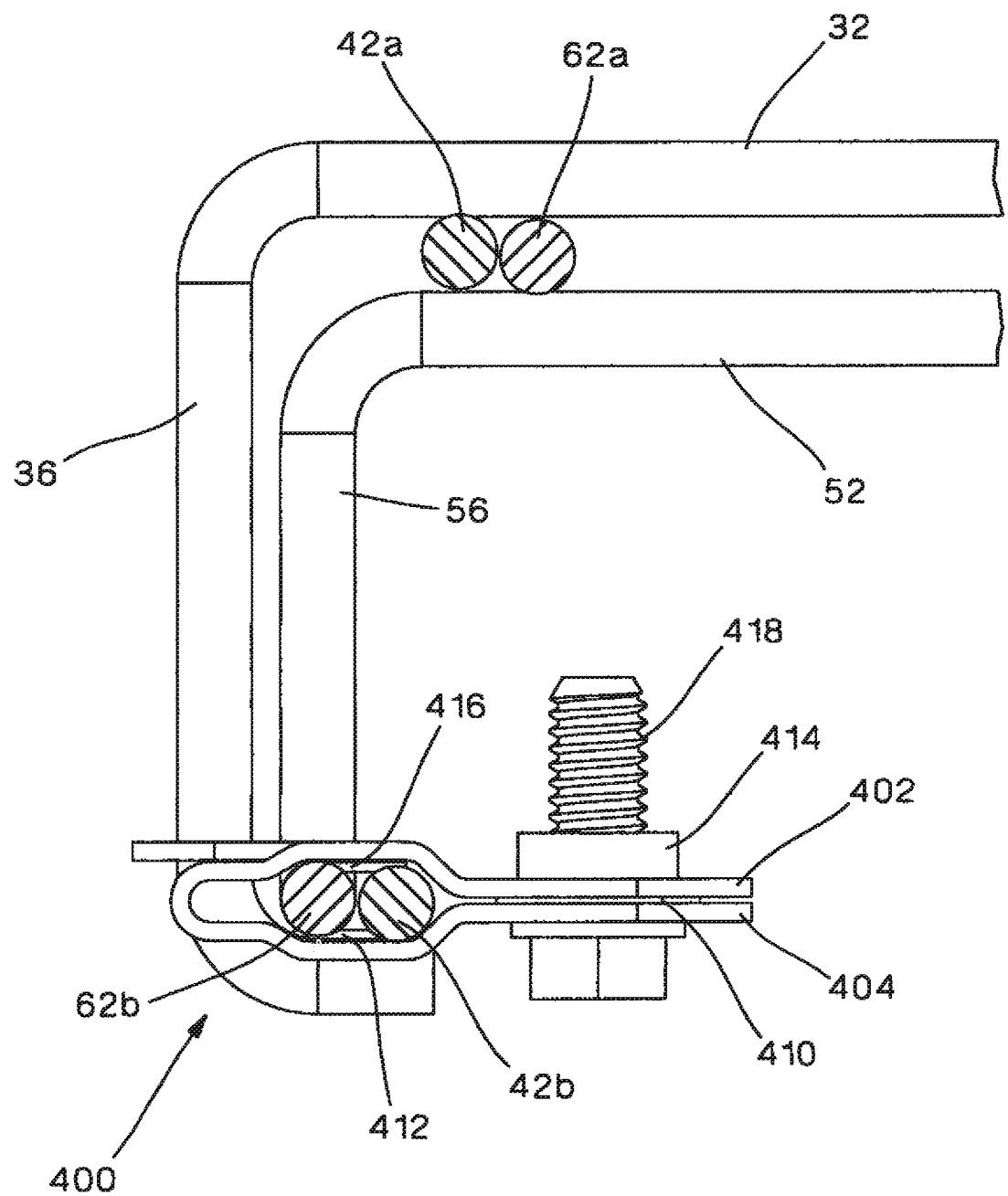
FIG. 26 illustrates a side view of the clamp of FIG. 24 installed on the overlapping wire cable trays.

FIGS. 21-23 illustrate the clamp 400 being installed on the outer cable wire tray 30 and the inner cable wire tray 50. The clamp 400 is formed in an open position to facilitate installing the clamp 400 over the lower longitudinal wires 42b, 62b of the outer wire cable tray 30 and the inner wire cable tray 50. The clamp 400 includes a top member 402, a bottom member 404 and a hook 406. The bottom member 404 of the clamp 400 includes a slot 408 for receiving a screw 418, or other fastener, and a retaining clip 410 for holding the screw 418 in place as the clamp 400 is installed on the lower longitudinal wires 42b, 62b of the overlapping wire cable trays. The bottom member 404 also includes paint piercing edges 412 that extend inward toward the top member 402 of the clamp 400. The top member 402 includes a fastener 414 for receiving the screw 418 and paint piercing edges 416 that extend inward toward the bottom member 404 of the clamp 400. The screw 418 is threaded into the fastener 414. The screw 418 is then tightened until the clamp 400 is closed. As the clamp 400 closes, the paint piercing edges 412, 416 are driven into the lower longitudinal wires 42b, 62b of the overlapping outer and inner wire cable trays 30, 50 (see FIGS. 24-26). Once the screw 418 has been fully tightened, the outer and inner wire cable trays 30, 50 are locked together. The paint piercing edges 412, 416 formed in the clamp 400 allow the clamp 400 to create an electrical and mechanical bond with the wire cable trays.

As illustrated in FIGS. 21-26, the hook 406 of the clamp 400 is wrapped around the side wall 36 of the transverse wire 32 of the outer cable tray 30 and the side wall 56 of the transverse wire 52 of the inner wire cable tray 50 to align the transverse wires 32, 52 of the wire cable trays. Although FIGS. 21-26 illustrate the clamp 400 attached to the overlapping wire cable trays of FIG. 1B, the clamp 400 may also be attached to the inner wire cable tray 50 of FIG. 1A and the outer wire cable tray 30 of FIG. 1C.

Figure 27:
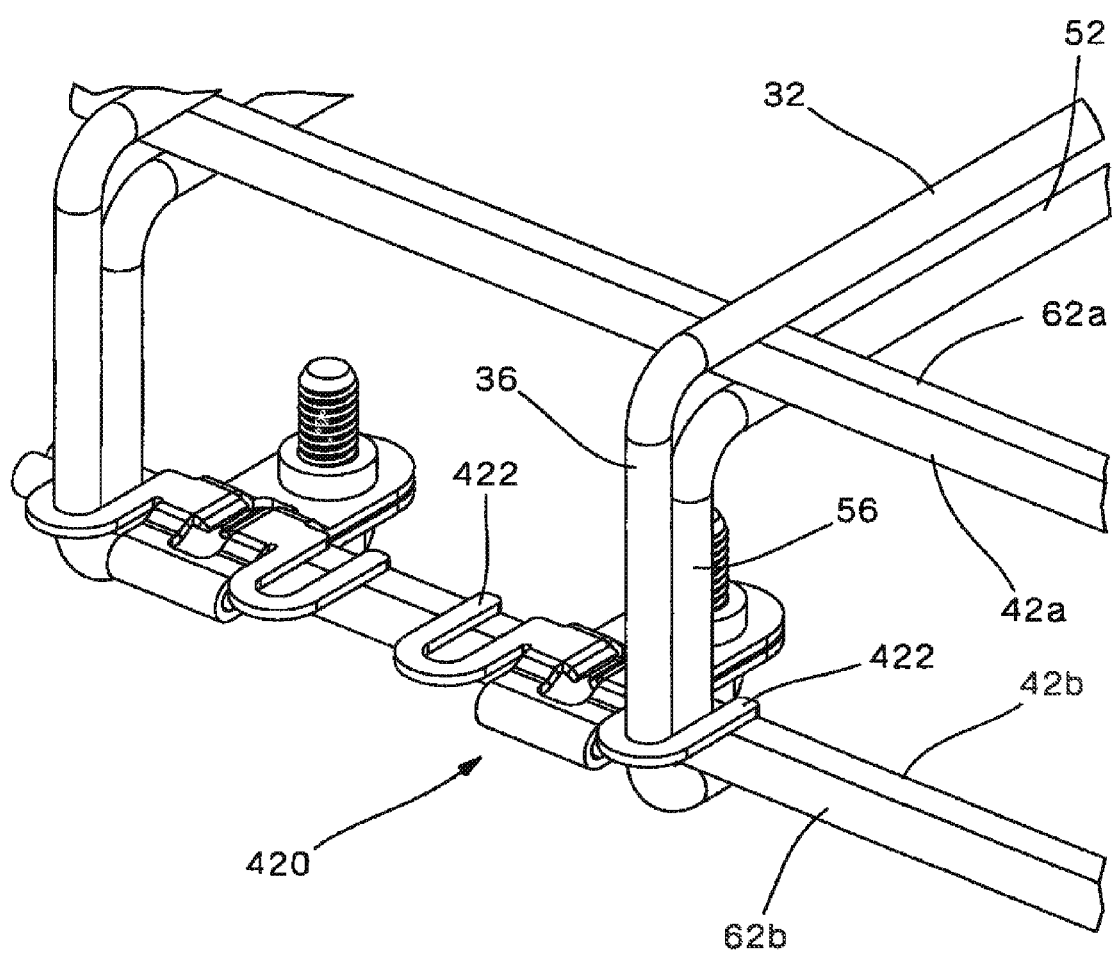
FIG. 27 illustrates a top perspective view of an alternative clamp installed on the overlapping wire cable trays of FIG. 1B.

FIG. 27 illustrates an alternative clamp 420 having a double hook 422. The double hook 422 allows the clamp 420 to be installed on either side of the side walls 36, 56 of the outer and inner wire cable trays 30, 50.

FIGS. 28-35 illustrate a wire form side wall 500 designed to be used on the telescoping wire cable tray system 20. The wire form side wall 500 creates a vertical wall along the sides of the wire cable trays for supporting cable routed on the wire cable trays. The wire form side wall 500 has an open frame design so that it can be deployed anywhere along the wire cable trays. The wire form side wall 500 may be mounted on the inner wire cable tray 50 of FIG. 1A (see FIGS. 28 and 29), the outer wire cable tray 30 of FIG. 1C (see FIGS. 30 and 31) and the overlapping wire cable trays of FIG. 1B (see FIGS. 32-34).

Figure 28:
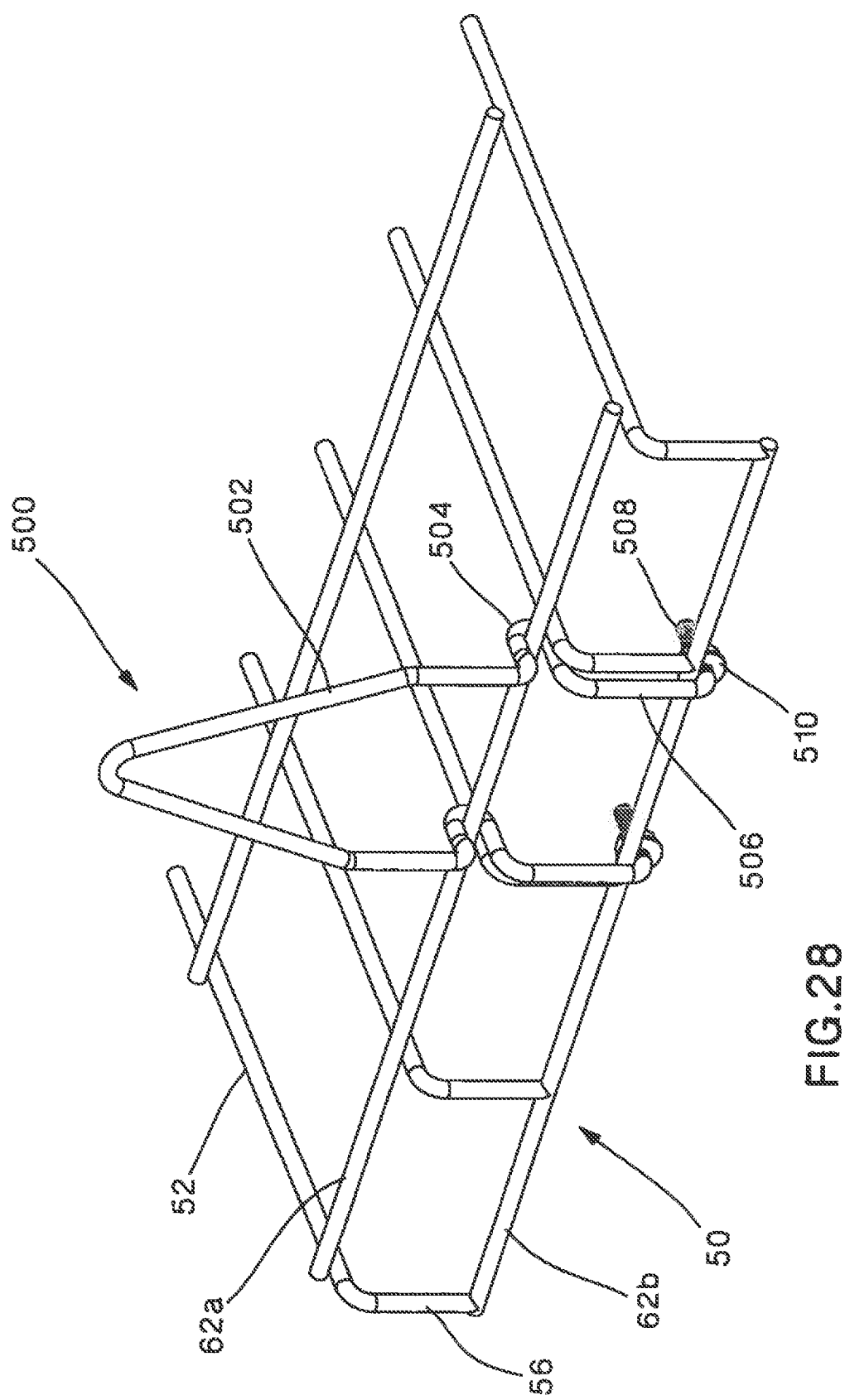
FIG. 28 illustrates a perspective view of a wire form side wall of the present invention installed on the inner wire cable tray of FIG. 1A.
Figure 29:
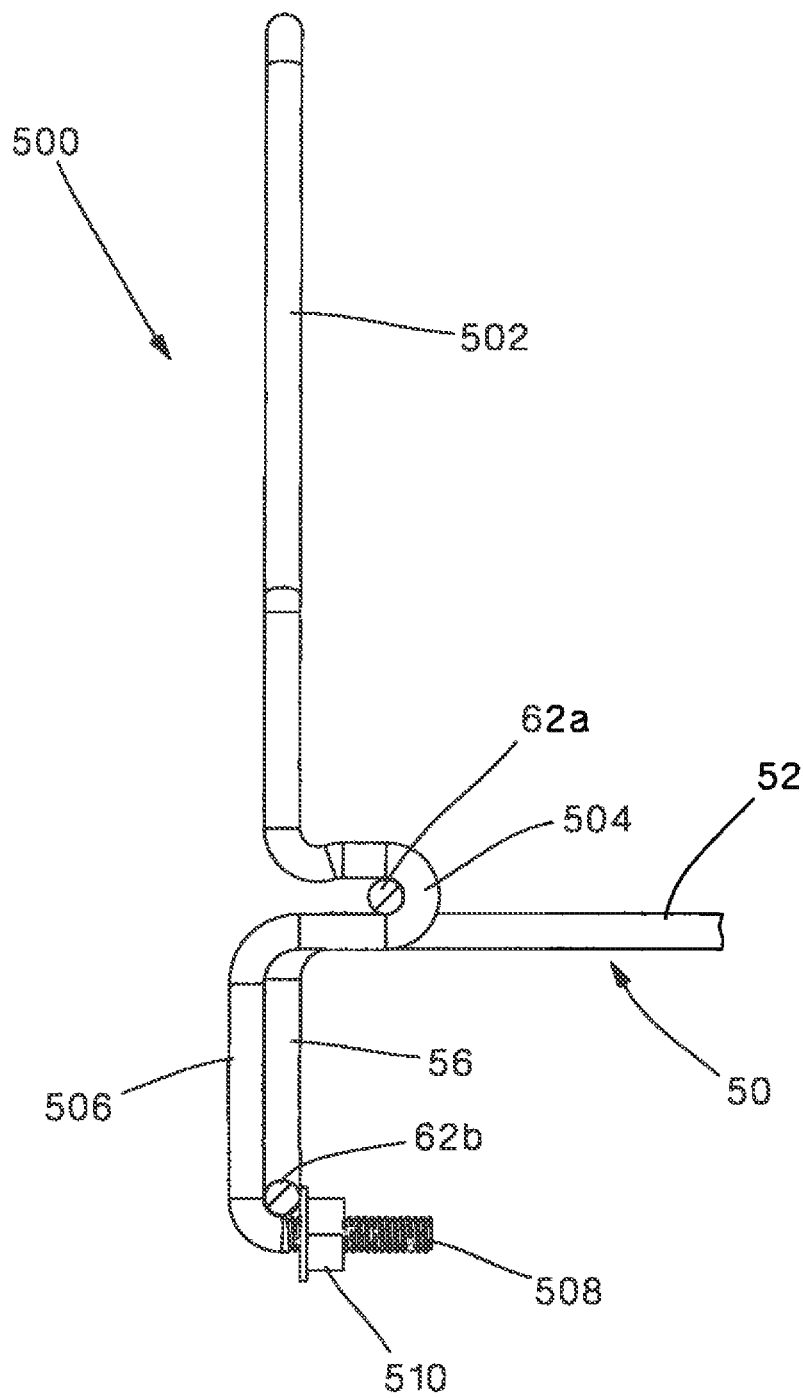
FIG. 29 illustrates a side view of the wire form side wall of FIG. 28 installed on the inner wire cable tray.

As illustrated in FIGS. 28 and 29, the wire form side wall 500 is installed on the inner wire cable tray 50 of FIG. 1A. The wire form side wall 500 includes an upper portion 502 that extends above the wire cable tray 50, a loop portion 504 and a lower portion 506 with two ends 508. The loop portion 504 loops around the upper longitudinal wires 62a of the inner wire cable tray 50 connecting the upper portion 502 and the lower portion 506 of the wire form side wall 500. The two ends 508 of the lower portion 506 are threaded. A hex nut 510 or a push nut is installed on each threaded end. A push nut with a cap to cover the ends of the threads may also be installed. As discussed below, once the wire form side wall 500 is installed on the inner cable tray 50, the nut 510 is tightened up to the lower longitudinal wire 62b of the inner wire cable tray 50 (see FIG. 29).

Figure 30:
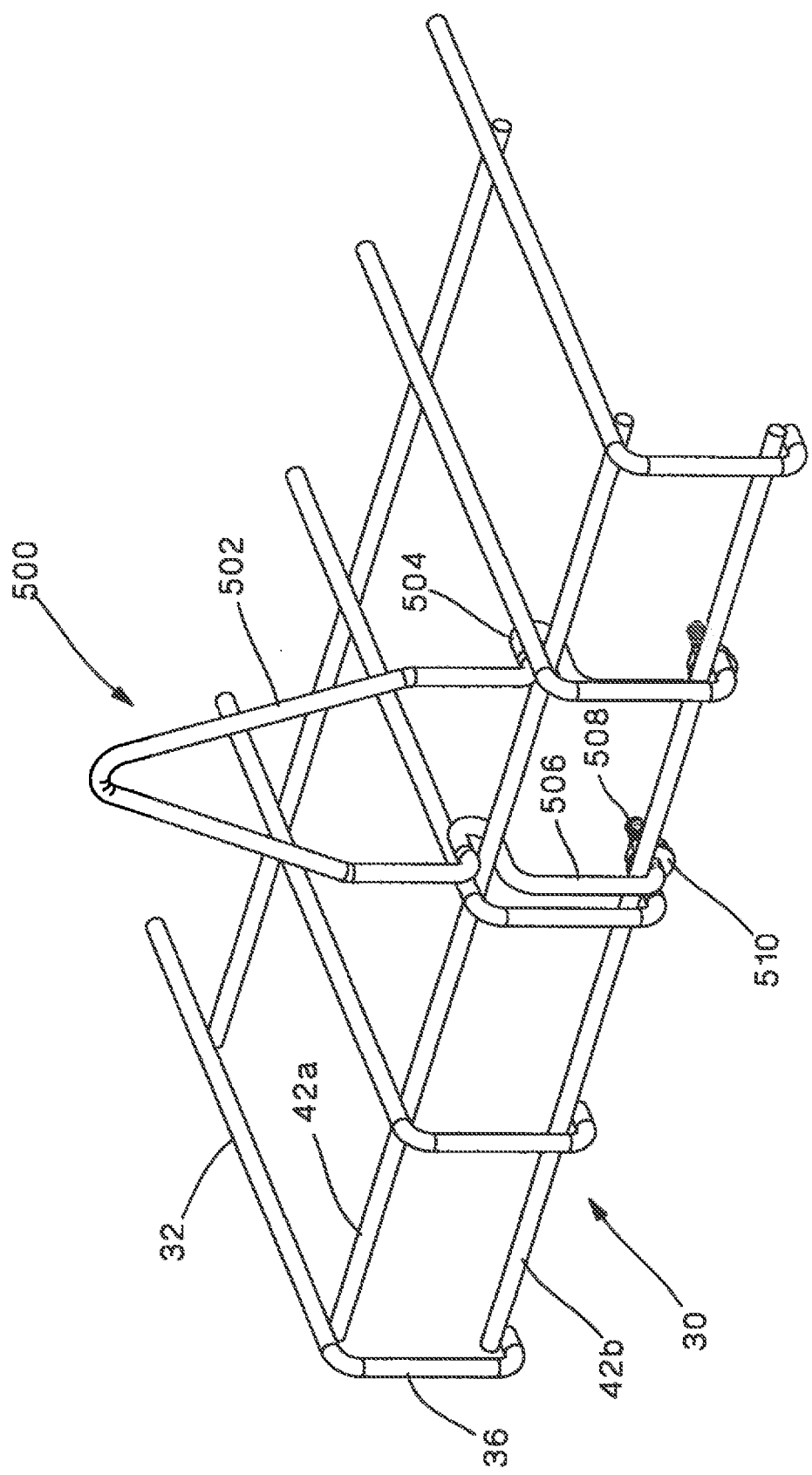
FIG. 30 illustrates a perspective view of the wire form side wall installed on the outer wire cable tray of FIG. 1C.
Figure 31:
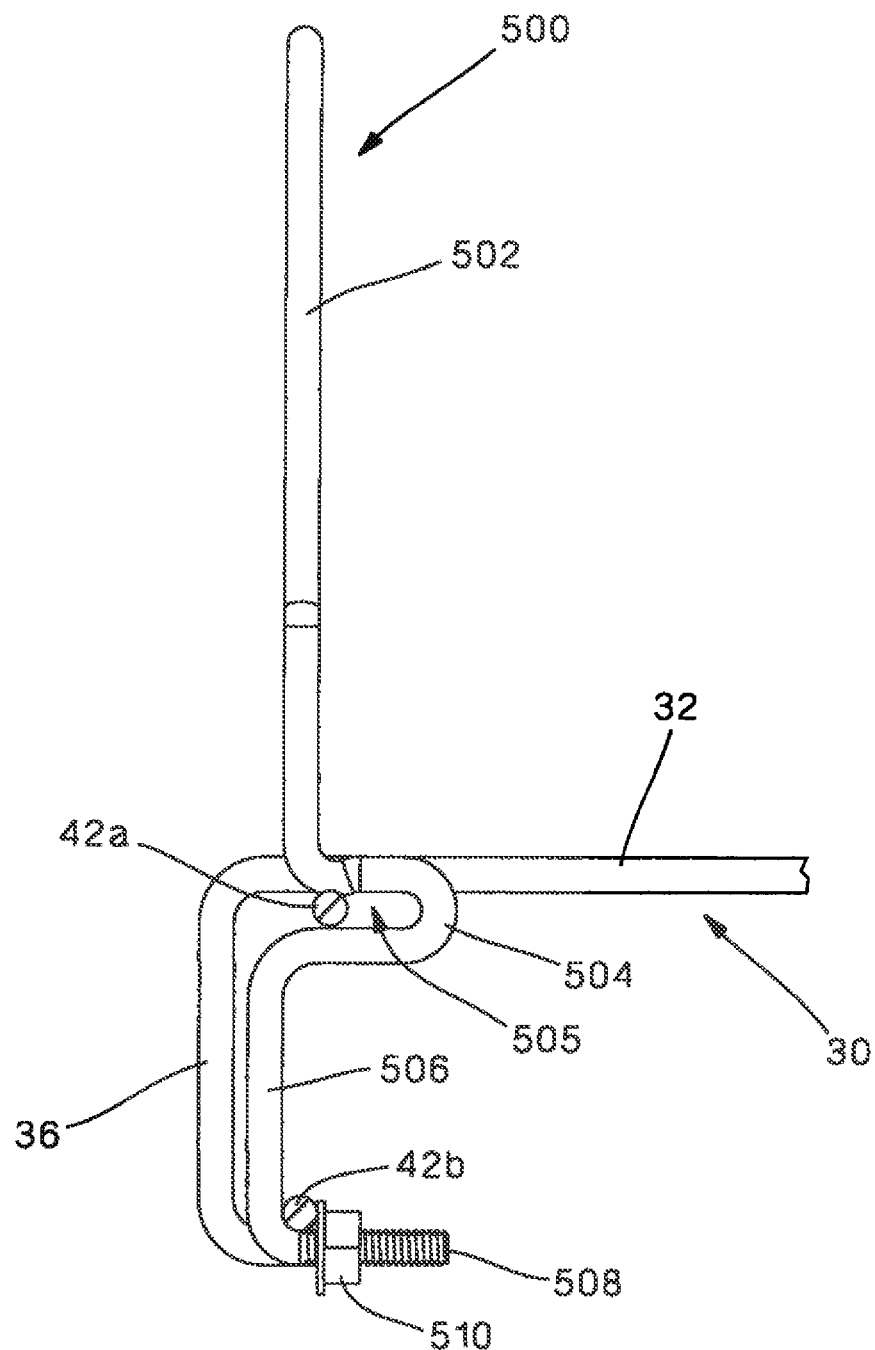
FIG. 31 illustrates a side view of the wire form side wall of FIG. 30 installed on the outer wire cable tray.

FIGS. 30 and 31 illustrate the wire form side wall 500 installed on the outer wire cable tray 30 of FIG. 1C. As discussed above, the wire form side wall 500 includes an upper portion 502, a loop portion 504 and a lower portion 506 with threaded ends 508. The upper portion 502 extends above the outer wire cable tray 30 and the loop portion 506 loops around the upper longitudinal wires 42a connecting the upper portion 502 to the lower portion 506. As illustrated in FIG. 31, the upper longitudinal wire 42a is positioned at the opening 505 of the loop portion 504. A nut 510 is installed on each threaded end 508 and is tightened up to the lower longitudinal wire 42b of the outer wire cable tray 30.

Figure 32:
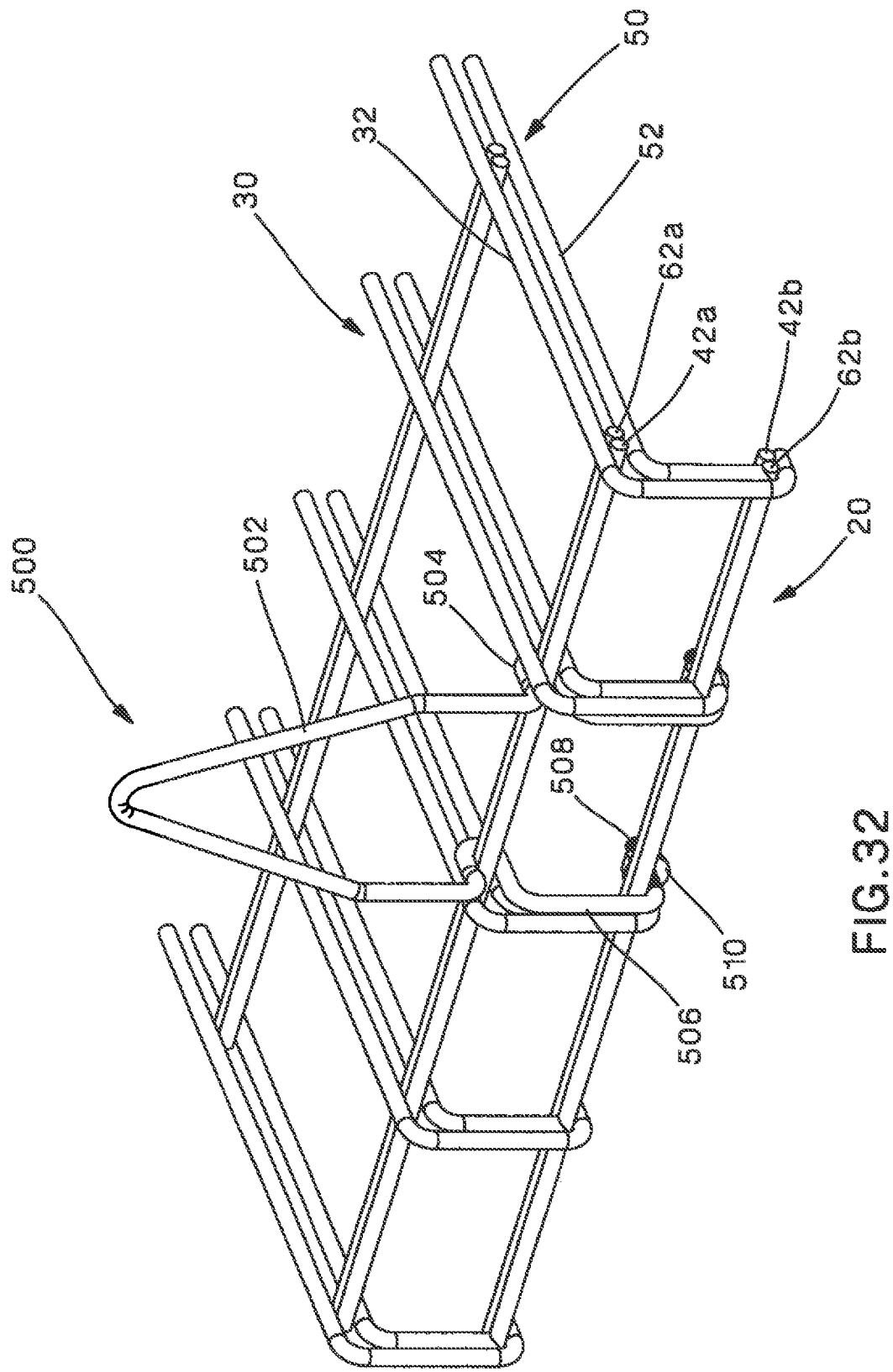
FIG. 32 illustrates a perspective view of the wire form side wall installed on the overlapping wire cable trays of FIG. 1B.
Figure 33:
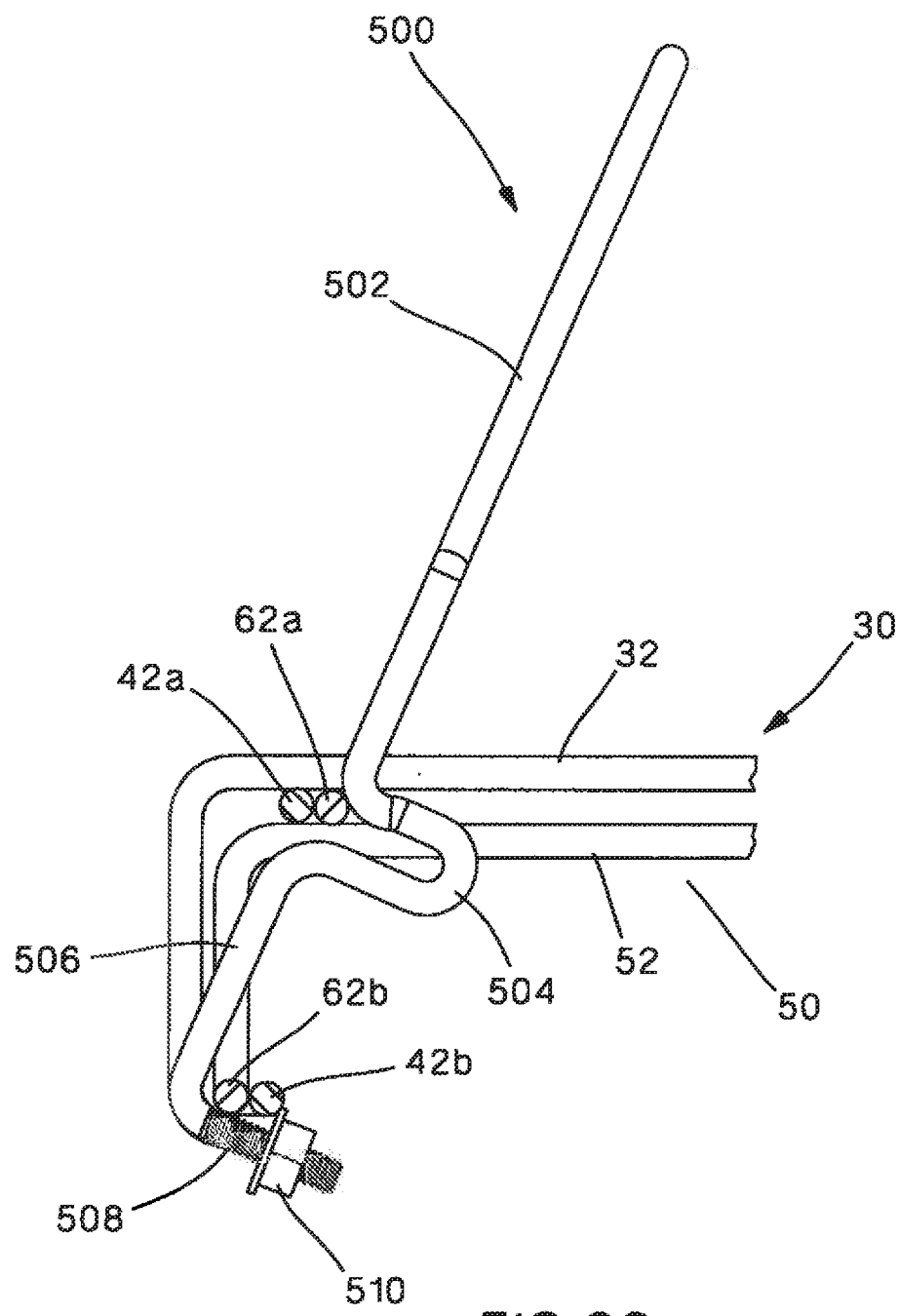
FIG. 33 illustrates a side view of the wire form side wall of FIG. 32 being installed on the overlapping wire cable trays.
Figure 34:
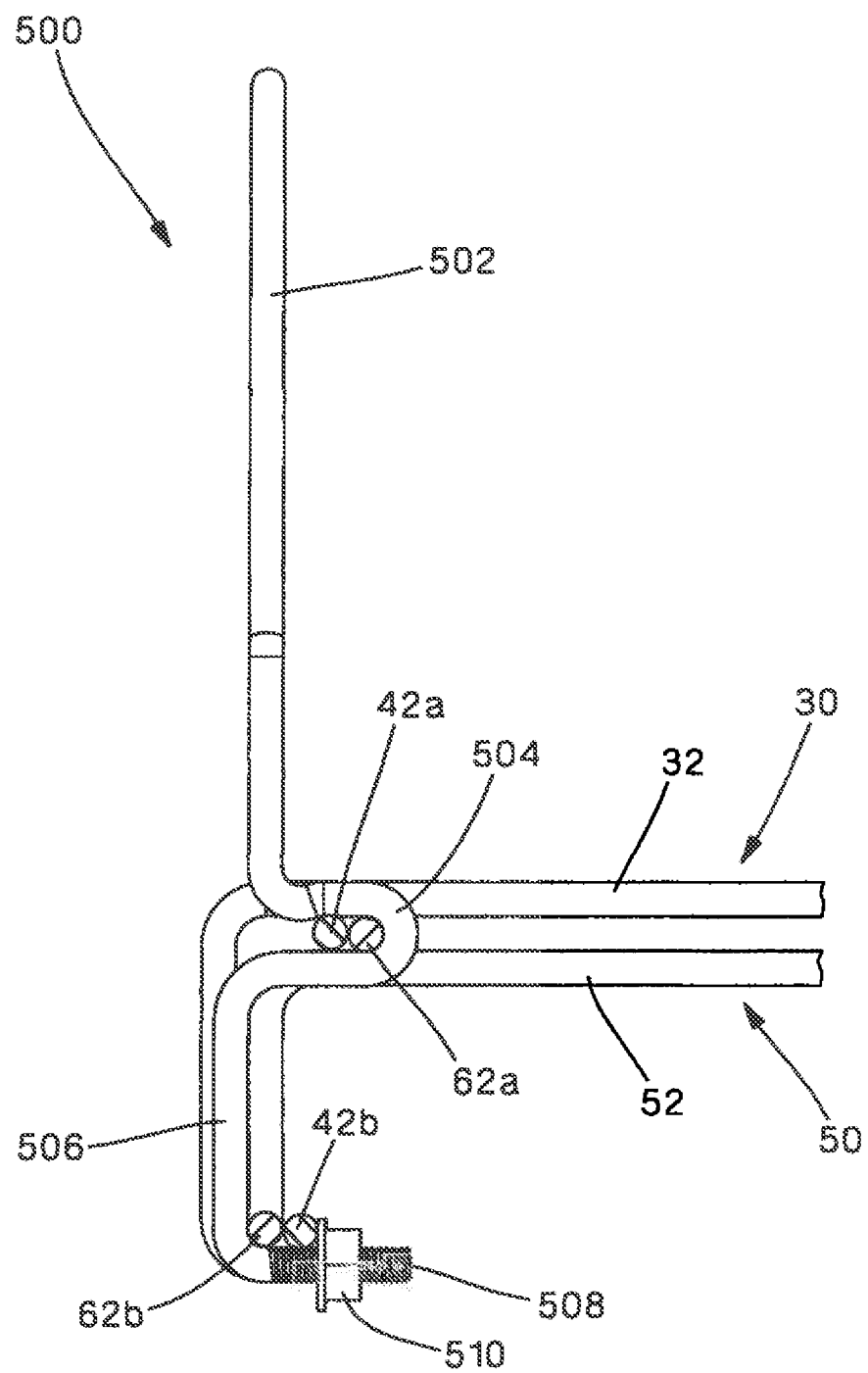
FIG. 34 illustrates a side view of the wire form side wall of FIG. 32 installed on the overlapping wire cable trays.

FIGS. 32-34 illustrate the wire form side wall 500 installed on the overlapping wire cable trays 30, 50 of FIG. 1B. FIG. 33 illustrates a typical installation process of the wire form side wall 500. First, the nuts 510 are preinstalled on the ends 508 of the wire form side wall 500. Next, the wire form side wall 500 is positioned so that the nuts 510 hook on to the lower longitudinal wires 42b, 62b of the wire cable trays as illustrated in FIG. 33. The wire form side wall 500 is then rotated upwardly to slide the loop section 504 over the upper longitudinal wire 62a of the inner wire cable tray 50 and the upper longitudinal wire 42a of the outer wire cable tray 30. Once the wire form side wall 500 is installed in the vertical position, the nuts 510 are tightened up to the lower longitudinal wire 42b of the outer wire cable tray 30 to lock the wire form side wall 500 onto the outer and inner wire cable trays 30, 50.

Figure 35:
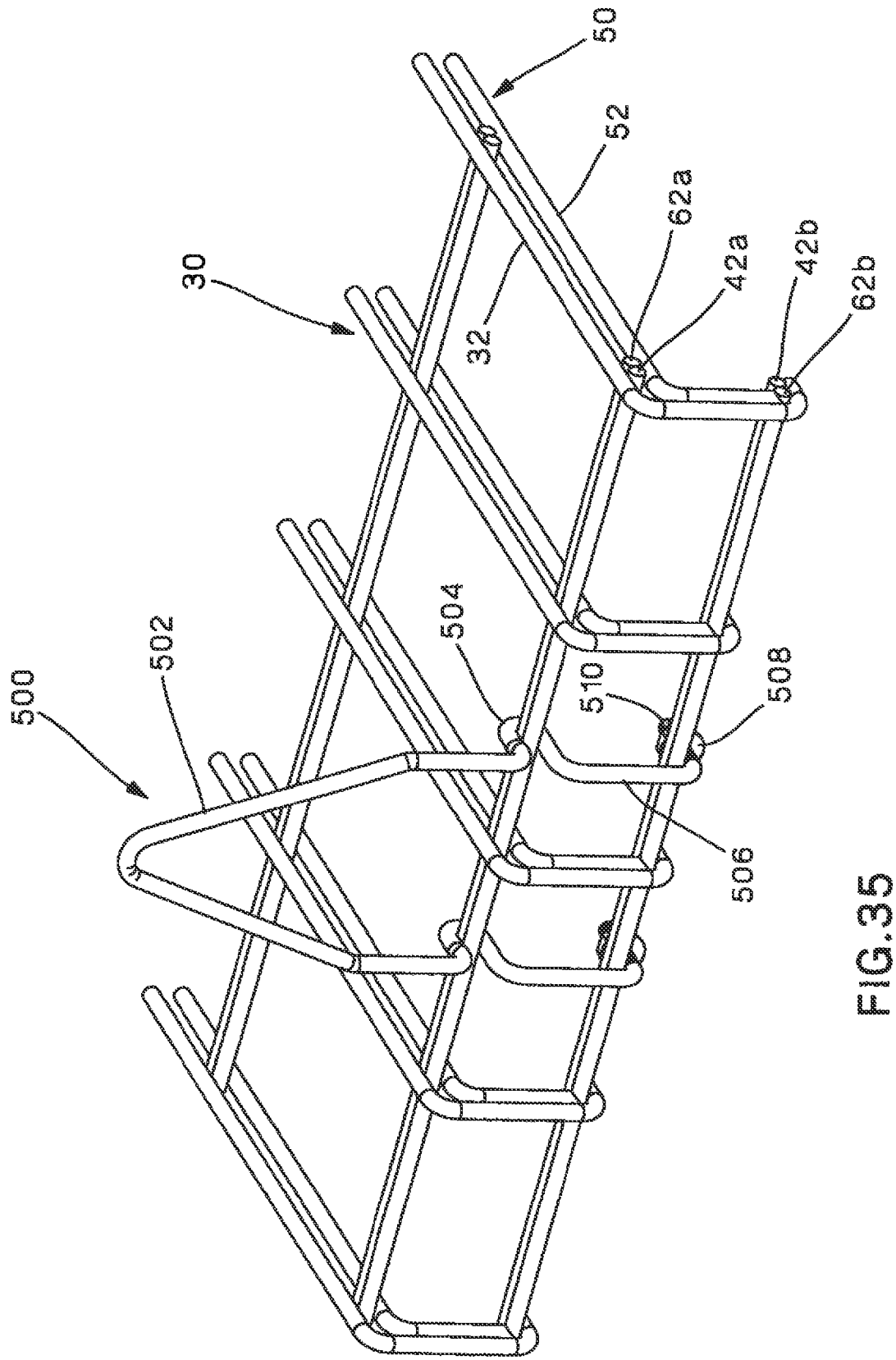
FIG. 35 illustrates a perspective view of the wire form side wall of FIG. 32 installed on the overlapping wire cable trays in an alternative position.

FIG. 35 illustrates the wire form side wall 500 installed in an alternative position over the outer wire cable tray 30 and the inner wire cable tray 50 of the telescoping wire cable tray system 20. The open frame design enables the wire form side wall 500 to be installed anywhere along the telescoping wire cable trays.

Figure 36:
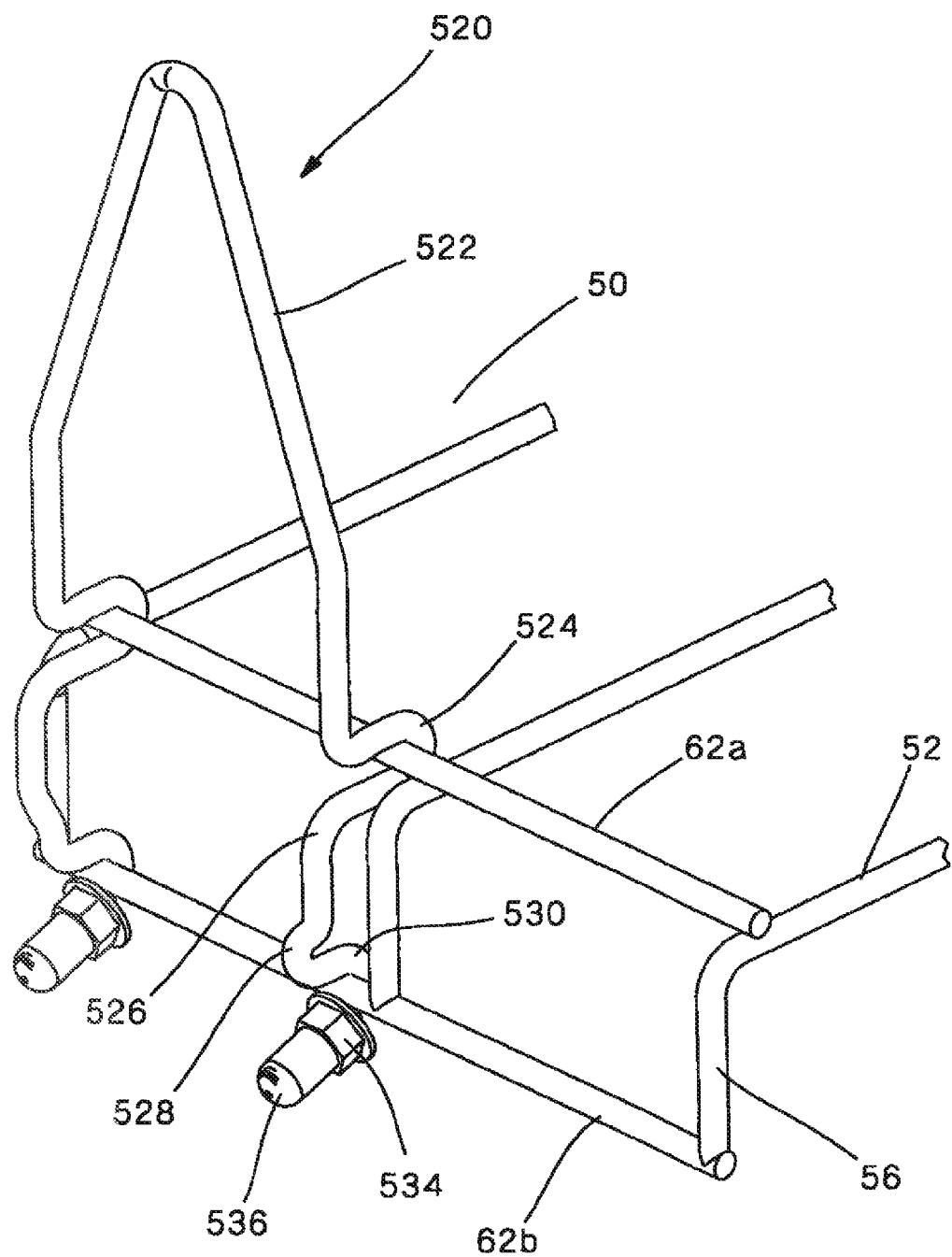
FIG. 36 illustrates a perspective view of an alternative wire from side wall of the present invention installed on the inner wire cable tray of FIG. 1A.
Figure 37:
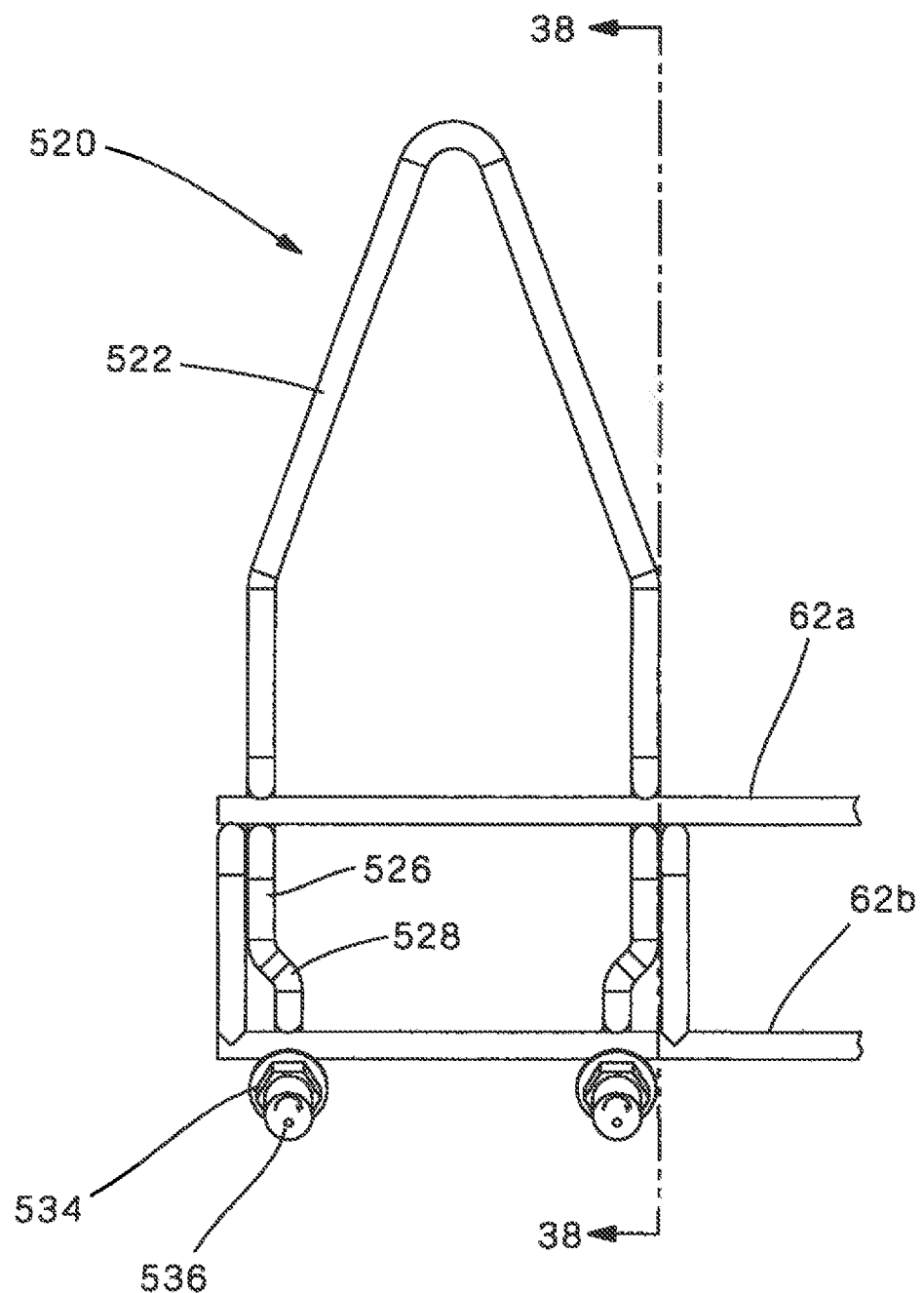
FIG. 37 illustrates a front view of the alternative wire form side wall of FIG. 36 installed on the inner wire cable tray.
Figure 38:
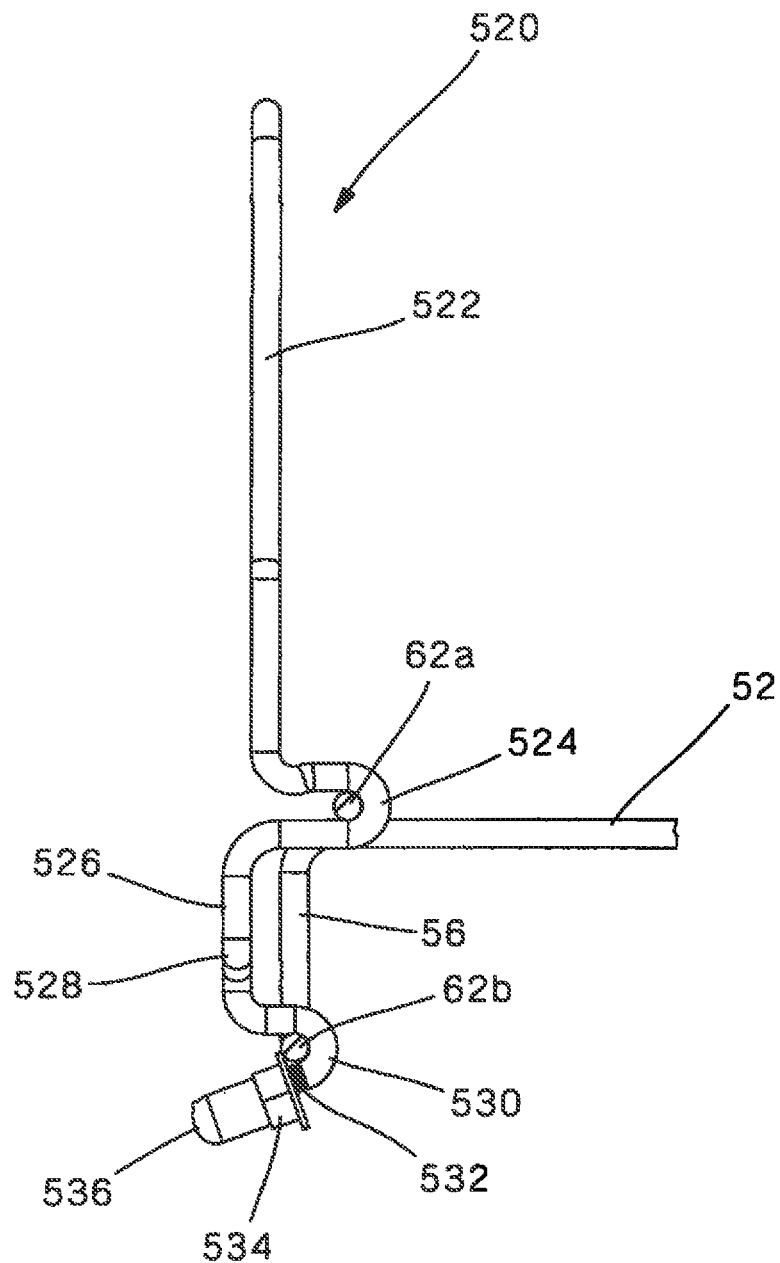
FIG. 38 illustrates a cross sectional view of the alternative wire form side wall of FIG. 37 taken along line 38-38.

FIGS. 36-38 illustrate an alternative design of the wire form side wall 520. Although the alternative design is illustrated installed on the inner wire cable tray 50 of FIG. 1A, the wire form side wall 520 may also be installed on the outer wire cable tray 30 of FIG. 1C and the overlapping wire cable trays of FIG. 1B. The wire form side wall 520 includes an upper portion 522 that extends vertically above the inner wire cable tray 50, a first loop portion 524 that loops around the upper longitudinal wire 62a of the inner wire cable tray 50 and a lower portion 526. The lower portion 526 of the wire form side wall 520 includes an inwardly extending portion 528 that leads to a second loop portion 530. The second loop portion 530 loops around the lower longitudinal wire 62b with the ends 532 of the wire form side wall 520 extending outwardly from the wire form side wall 520 and the inner wire cable tray 50. A push nut 534 with a cap 536 is installed at each end 532 of the wire form side wall 520.

The invention claimed is:

1. A wire cable tray system comprising:
a plurality of wire cable trays, wherein each wire cable tray includes a plurality of transverse wires and a plurality of longitudinal wires, wherein the plurality of transverse wires include a top portion and side walls and the plurality of longitudinal wires include upper longitudinal wires positioned beneath the top portion of the transverse wires and lower longitudinal wires positioned at each end of the side walls of the transverse wires; and
a trapeze support device for supporting the wire cable trays;
wherein the trapeze support device includes a trapeze support bar and at least one locking clip, the trapeze support bar having a channel defined by a bottom and side walls extending from the bottom, the side walls including an upper support surface and a lower support surface;
wherein the lower support surface supports the lower longitudinal wires and the upper support surface supports the upper longitudinal wires;
wherein the channel includes a first end, a second end and a middle portion located between the first and second ends; the lower support surface extends from the first end to the second end and the upper support surface extends from the lower support surface in the middle portion of the channel;
wherein support arms extending from the lower support surface to the upper support surface in the middle portion of the channel; and
the at least one locking clip slides along the trapeze support bar, wherein the at least one locking clip secures the trapeze support device to the wire cable tray.

2. The wire cable tray system of claim 1, wherein the plurality of transverse wires form a flat top for supporting cables routed in the wire cable tray system.

3. The wire cable tray system of claim 1, wherein the locking clip includes a bottom member with side walls extending upwardly from the bottom member and a hook extending from each side wall, whereby the locking clip slides along the trapeze support bar until the hooks engage the wire cable tray.

4. The wire cable tray system of claim 3, wherein the hooks engage the lower longitudinal wires.

5. The wire cable tray system of claim 1, wherein the upper support surface includes outwardly extending flanges and the lower support surface includes inwardly extending flanges.

6. The wire cable tray system of claim 1, further comprising a bend radius fitting extending over an open area between adjacent transverse wires, wherein the bend radius fitting includes a bend radius portion, upwardly extending side flanges and snaps for securing the bend radius fitting to adjacent transverse wires.

7. A wire cable tray system comprising:
a plurality of wire cable trays, wherein each cable tray having a plurality of transverse wires and a plurality of longitudinal wires, wherein the plurality of transverse wires include a top portion and side walls and the plurality of longitudinal wires include upper longitudinal wires positioned beneath the top portion of the transverse wires and lower longitudinal wires positioned at each end of the side walls of the transverse wires; and
a trapeze support device for supporting the wire cable trays from a ceiling, wherein the trapeze support device includes a trapeze support bar and at least one locking clip;
wherein the trapeze support bar comprising a channel defined by a bottom and side walls extending from the bottom, the channel includes a first end, a middle portion and a second end;
a support surface extending from the side walls, wherein the support surface having a lower support surface and an upper support surface, wherein the lower support surface supports the lower longitudinal wires and the upper support surface supports the upper longitudinal wires;
wherein the lower support surface extends from the first end to the second end and the upper support surface extends from the lower support surface in the middle portion of the channel; and
wherein support arms extending from the lower support surface to the upper support surface in the middle portion of the channel.

8. The wire cable tray system of claim 7, wherein the plurality of transverse wires form a flat top for supporting cables routed in the wire cable tray system.

9. The wire cable tray system of claim 7, wherein the locking clip includes a bottom member with side walls extending upwardly from the bottom member and a hook extending from each side wall, whereby the locking clip slides along the trapeze support bar until the hooks engage the wire cable tray.

10. The wire cable tray system of claim 9, wherein the hooks engage the lower longitudinal wires.

11. The wire cable tray system of claim 7, wherein the upper support surface includes outwardly extending flanges and the lower support surface includes inwardly extending flanges.

12. The wire cable tray system of claim 7, further comprising a bend radius fitting extending over an open area between adjacent transverse wires, wherein the bend radius fitting includes a bend radius portion, upwardly extending side flanges and snaps for securing the bend radius fitting to adjacent transverse wires.

13. A wire cable tray system comprising:
    a plurality of wire cable trays, wherein each wire cable tray includes a plurality of transverse wires and a plurality of longitudinal wires; and
    a trapeze support device for supporting the wire cable trays;
    wherein the trapeze support device includes a trapeze support bar and at least one locking clip, the trapeze support bar having a channel defined by a bottom and side walls extending from the bottom, the side walls including an upper support surface and a lower support surface; and
    wherein the locking clip includes a bottom member with side walls extending upwardly from the bottom member and a hook extending from each side wall, the locking clip slides along the trapeze support bar until the hooks engage the wire cable tray, wherein the at least one locking clip secures the trapeze support device to the wire cable tray.

14. The wire cable tray system of claim 13, wherein the plurality of transverse wires include a top portion and side walls and the plurality of longitudinal wires include upper longitudinal wires positioned beneath the top portion of the transverse wires and lower longitudinal wires positioned at each end of the side walls of the transverse wires; and
    wherein the hooks engage the lower longitudinal wires.

15. A wire cable tray system comprising:
    a plurality of wire cable trays, wherein each cable tray having a plurality of transverse wires and a plurality of longitudinal wires; and
    a trapeze support device for supporting the wire cable trays from a ceiling, wherein the trapeze support device includes a trapeze support bar and at least one locking clip;
    wherein the trapeze support bar comprising a channel defined by a bottom and side walls extending from the bottom, the channel includes a first end, a middle portion and a second end;
    a support surface extending from the side walls, wherein the support surface having a lower support surface and an upper support surface; and
    wherein the locking clip includes a bottom member with side walls extending upwardly from the bottom member and a hook extending from each side wall, whereby the locking clip slides along the trapeze support bar until the hooks engage the wire cable tray.

16. The wire cable tray system of claim 15, wherein the plurality of transverse wires include a top portion and side walls and the plurality of longitudinal wires include upper longitudinal wires positioned beneath the top portion of the transverse wires and lower longitudinal wires positioned at each end of the side walls of the transverse wires; and
    wherein the hooks engage the lower longitudinal wires.

* * * * *